United States Patent
Shi

(10) Patent No.: US 12,477,516 B2
(45) Date of Patent: Nov. 18, 2025

(54) PAGING PROCESSING METHOD, COMMUNICATION DEVICE AND STORAGE MEDIUM

(71) Applicant: Beijing Xiaomi Mobile Software Co., Ltd., Beijing (CN)

(72) Inventor: Rao Shi, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 362 days.

(21) Appl. No.: 18/246,019

(22) PCT Filed: Sep. 24, 2020

(86) PCT No.: PCT/CN2020/117556
§ 371 (c)(1),
(2) Date: Mar. 20, 2023

(87) PCT Pub. No.: WO2022/061678
PCT Pub. Date: Mar. 31, 2022

(65) Prior Publication Data
US 2024/0098691 A1    Mar. 21, 2024

(51) Int. Cl.
*H04W 68/02* (2009.01)
*H04W 4/06* (2009.01)
*H04W 68/00* (2009.01)

(52) U.S. Cl.
CPC ............. *H04W 68/02* (2013.01); *H04W 4/06* (2013.01); *H04W 68/005* (2013.01)

(58) Field of Classification Search
CPC ..... H04W 68/02; H04W 4/06; H04W 68/005; H04W 68/00
See application file for complete search history.

(56) References Cited

U.S. PATENT DOCUMENTS

2017/0367069 A1* 12/2017 Agiwal ................. H04B 7/088
2018/0324758 A1* 11/2018 Tenny ................. H04W 68/025

FOREIGN PATENT DOCUMENTS

| CN | 102625254 A | 8/2012 |
| CN | 107113776 A | 8/2017 |
| CN | 110536384 A | 12/2019 |
| WO | 2015051547 A1 | 4/2015 |
| WO | 2015051614 A1 | 4/2015 |

OTHER PUBLICATIONS

"Considerations on paging enhancements," Proceedings of the 3GPP TSG RAN WG1 #102e, Sony, R1-2005582, Aug. 17, 2020, e-Meeting, 4 pages.
"Consideration on Idle/inactive-mode UE power saving," Proceedings of the 3GPP TSG-RAN WG2 Meeting RAN2#111, Lenovo, Motorola Mobility, R2-2007468, Aug. 17, 2020, Electronic Online, 2 pages.
"Considerations on paging enhancements," Proceedings of the 3GPP TSG RAN WG1 #102e, Sony, R1-2005582, Aug. 17, 2020, e-Meeting, 8 pages.

* cited by examiner

*Primary Examiner* — Michael A Faragalla
(74) *Attorney, Agent, or Firm* — McCoy Russell LLP

(57) ABSTRACT

A paging processing method, performed by a base station, and including: broadcasting a paging configuration message, where the paging configuration message is configured to indicate groups or more than one paging frame within one paging cycle, where each of the groups includes at least one paging frame, and each of the groups is configured to associate user equipments (UEs) of the same type.

12 Claims, 11 Drawing Sheets

PAGING PROCESSING METHOD, COMMUNICATION DEVICE AND STORAGE MEDIUM

CROSS REFERENCE TO RELATED APPLICATION

The present application is a U.S. National Phase of International Application No. PCT/CN2020/117556 entitled "PAGING PROCESSING METHOD AND APPARATUS, COMMUNICATION DEVICE AND STORAGE MEDIUM," and filed on Sep. 24, 2020. The entire contents of the above-listed applications are hereby incorporated by reference for all purposes.

BACKGROUND

In the related art, a paging message may be sent to a user equipment (UE) in a Radio Resource Control (RRC) idle state (IDLE) and an RRC inactive state (INACTIVE). The UE may initiate a connection resume process by means of paging, so as to return to an RRC connected state again. Additionally, the paging message may further be used for notifying UEs in all states under the coverage of a network to receive system message updating, and for notifying the UEs to receive warning information from Earthquake and Tsunami Warning System (ETWS) and Commercial Mobile Alert Service (CMAS) etc.

SUMMARY

The disclosure relates to, but is not limited to, the field of wireless communication, in particular to a paging processing method and apparatus, a communication device and a storage medium.

According to a first aspect of the examples of the disclosure, there is provided a paging processing method performed by a base station, and the paging processing method includes: broadcasting a paging configuration message, where the paging configuration message is configured to indicate groups for more than one paging frame within one paging cycle, each of the groups includes at least one paging frame, and each of the groups is configured to associate user equipments (UEs) of the same type.

According to a second aspect of the examples of the disclosure, there is provided a paging processing method performed by a UE, and the paging processing method includes: receiving a paging configuration message, where the paging configuration message is configured to indicate groups for more than one paging frame within one paging cycle, each of the groups includes at least one paging frame, and each of the groups is configured to associate user equipments (UEs) of the same type.

According to a third aspect of the disclosure, there is provided a paging processing apparatus applied to a base station, and the paging processing apparatus includes: a first sending module, configured to broadcast a paging configuration message, where the paging configuration message is configured to indicate groups for more than one paging frame within one paging cycle, each of the groups includes at least one paging frame, and each of the groups is configured to associate user equipments (UEs) of the same type.

According to a fourth aspect of the disclosure, there is provided a paging processing apparatus applied to UE, and the paging processing apparatus includes: a second receiving module, configured to receive a paging configuration message, where the paging configuration message is configured to indicate groups for more than one paging frame within one paging cycle, each of the groups includes at least one paging frame, and each of the groups is configured to associate user equipments (UEs) of the same type.

According to a fifth aspect of the examples of the disclosure, there is provided a communication device, including: a processor; and a memory, configured to store processor-executable instructions; where the processor is configured to implement the paging processing method of any example of the disclosure when running the executable instructions.

According to a sixth aspect of the examples of the disclosure, there is provided a non-transitory computer storage medium, the computer storage medium stores computer-executable programs, and the executable programs, when executed by a processor, cause the processor to execute the paging processing method of any example of the disclosure.

It should be understood that the above general descriptions and following detailed descriptions are exemplary and illustrative, and cannot limit the examples of the disclosure.

DETAILED DESCRIPTION

Examples will be described in detail, instances of which are shown in the accompanying drawings. When the following description refers to the accompanying drawings, unless otherwise indicated, the same numbers in different drawings indicate the same or similar elements. The implementations described in the following examples do not represent all implementations consistent with the examples of the disclosure. Rather, they are instances of apparatuses and methods consistent with some aspects of the examples of the disclosure as detailed in the appended claims.

The terms used in the examples of the disclosure are for the purpose of describing examples, and are not intended to limit the examples of the disclosure. The terms "one" and "this" in a singular form used in the examples of the disclosure and the appended claims are also intended to include a plural form unless otherwise clearly indicated in the context. It should also be understood that the term "and/or" as used in the disclosure refers to and includes any or all possible combinations of one or more of associated listed items.

It should be understood that although the terms such as first, second, third, etc. may be used to describe various information in the examples of the disclosure, such information should not be limited to these terms. These terms are used to distinguish the same type of information from each other. For example, without departing from the scope of the examples of the disclosure, first information may also be referred to as second information, and similarly, the second information may also be referred to as the first information. Depending on the context, the words "if" as used in the disclosure may be interpreted as "at the time" or "when" or "in response to determining".

Figure 1:
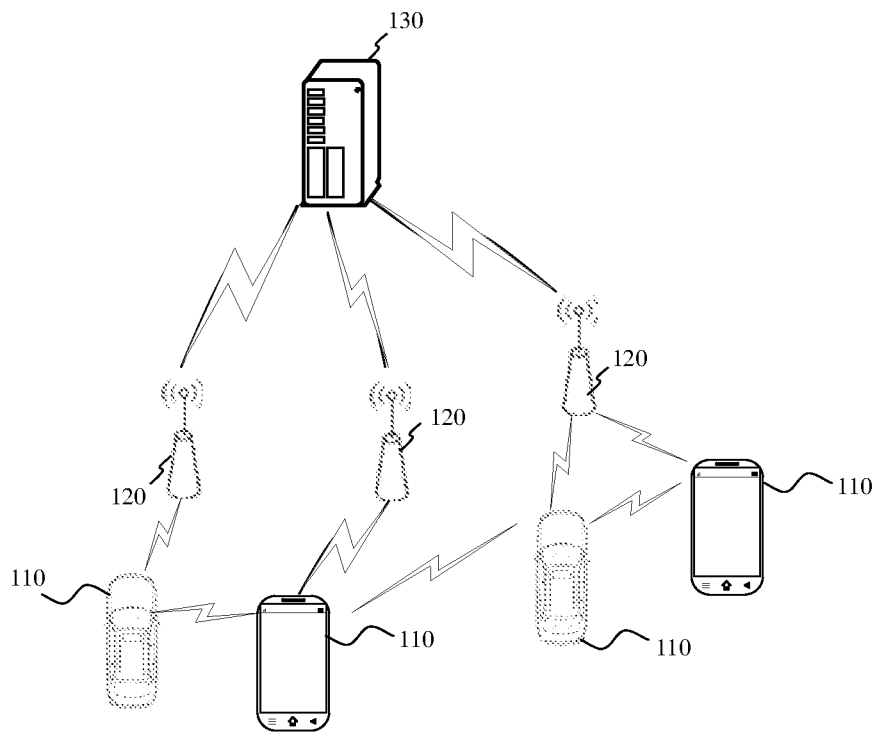
FIG. 1 is a schematic structural diagram of a wireless communication system.

Referring to FIG. 1, it shows a schematic structural diagram of a wireless communication system according to an example of the disclosure. As shown in FIG. 1, the wireless communication system is a communication system based on a cellular mobile communication technology. The wireless communication system may include more than one user equipment 110 and more than one base station 120.

The user equipment 110 may be a device that provides a user with voice and/or data connectivity. The user equipment 110 may communicate with one or more core networks via a Radio Access Network (RAN). The user equipment 110 may be an Internet-of-Things user equipment, such as a sensor device, a mobile phone (or called a "cellular" phone) and a computer with an Internet-of-Things user equipment. For example, the user equipment may be a stationary, portable, pocket-size, handheld, computer-built-in or vehicle-mounted device. For example, the user equipment may be a station (STA), a subscriber unit, a subscriber station, a mobile station, a mobile, a remote station, an access point, a remote terminal, an access terminal, a user terminal, a user agent, a user device, or a user equipment. Alternatively, the user equipment 110 may further be an unmanned aircraft device. Alternatively, the user equipment 110 may further be a vehicle-mounted device, such as a trip computer with a wireless communication function, or a wireless user equipment externally connected with a trip computer. Alternatively, the user equipment 110 may further be a roadside device, such as a street lamp, a signal light or other roadside devices with a wireless communication function.

The base station 120 may be a network-side device in the wireless communication system. The wireless communication system may be a 4th generation mobile communication (4G) system, also known as a long term evolution (LTE) system. Alternatively, the wireless communication system may also be a 5G system, also known as a new radio (NR) system or a 5G NR system. Alternatively, the wireless communication system may also be a next-generation system of the 5G system. An access network in the 5G system may be referred to as a New Generation-Radio Access Network (NG-RAN).

The base station 120 may be an evolved base station (eNB) adopted in the 4G system. Alternatively, the base station 120 may also be a base station adopting a centralized-distributed architecture (gNB) in the 5G system. In the case that the base station 120 adopts the centralized-distributed architecture, the base station 120 generally includes a central unit (CU) and at least two distributed units (DUs). The central unit is provided with protocol stacks of a Packet Data Convergence Protocol (PDCP) layer, a Radio Link Control (RLC) protocol layer and a Medium Access Control (MAC) layer. The distributed unit is provided with protocol stacks of a Physical (PHY) layer. The implementations of the base station 120 are not limited in the examples of the disclosure.

Wireless connection may be established between the base station 120 and the user equipment 110 through wireless air interface. In various implementations, the wireless air interface may be a wireless air interface based on a 4G standard. Alternatively, the wireless air interface may be a wireless air interface based on a 5G standard, for example, the wireless air interface may be a new radio. Alternatively, the wireless air interface may also be a wireless air interface based on a next-generation mobile communication network technology standard of 5G.

In some examples, an End-to-End (E2E) connection may be established between the user equipments 110. For example, the E2E connection may be vehicle-to-vehicle (V2V) communication, vehicle-to-infrastructure (V2I) communication and vehicle-to-pedestrian (V2P) communication in vehicle-to-everything (V2X) communication and other scenarios.

The above user equipment may be considered as a terminal device in following examples.

In some examples, the above wireless communication system may further include a network management device 130.

The more than one base station 120 is respectively connected with the network management device 130. The network management device 130 may be a core network device in the wireless communication system. For example, the network management device 130 may be a Mobility Management Entity (MME) in an Evolved Packet Core (EPC). Alternatively, the network management device may also be other core network devices, such as a Serving Gateway (SGW), a Public Data Network Gateway (PGW), a Policy and Charging Rules Function (PCRF) or a Home Subscriber Server (HSS), etc. The implementation of the network management device 130 is not limited in the examples of the disclosure.

In related art, the network may send the paging message in a paging occasion (PO) of the UE. However, in the case that there are more UEs, it is possible that there exists more than one UE needing to be paged in one paging frame or one PO. Only UEs where the paging message actually exists will receive the paging message correctly, while remaining UEs will continue to be in an idle mode. This will result in unnecessary paging.

In related application scenario, in the case that a network-side entity sends a paging message at a paging occasion of UE, the UE needs to calculate, based on its own identification, a paging occasion for obtaining the paging message. A calculation formula for calculating the paging occasion is as follows:

$$(SFN + \text{PF\_offset}) \bmod T = (T \, div \, N) \times (\text{UE\_ID} \bmod N)$$

$$i\_s = \text{floor}\left(\frac{\text{UE\_ID}}{N}\right) \bmod Ns$$

SFN refers to a frame number of a paging frame; PF_offset refers to a frame offset of the paging frame; T refers to a paging cycle; N refers to the number of paging frames included in one paging cycle; UE_ID refers to an identification of the UE; Ns refers to the number of paging occasions included in one paging frame; i_s refers to an ordinal number of a paging occasion; and PF refers to a paging frame.

In one example, UE_ID may be obtained through an International Mobile Subscriber Identity (IMSI). For example, an identification of a user may be obtained through "IMSI mod 2014".

A "mod" function refers to a function for solving a remainder, namely a remainder obtained after performing division operation on two numerical expressions. For example, (SFN+PF_offset) mod T refers to obtain a remainder of dividing (SFN+PF_offset) by T.

A "floor" function refers to a round-down function, that is, an integer not greater than a numerical expression is taken. For example, floor(3.7)=3.

Figure 2:
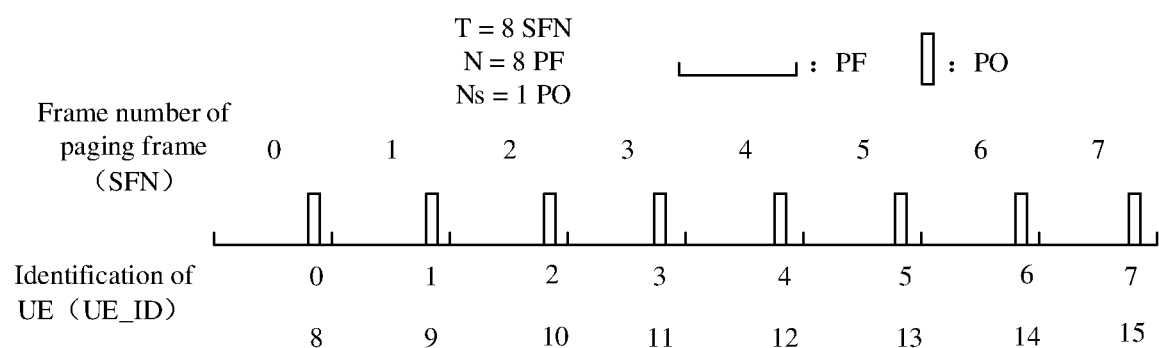
FIG. 2 is a schematic diagram of a paging frame within a paging cycle according to an example of the disclosure.

For example, take the following as an example: there are 16 UEs with UE_IDs being 0 to 15 respectively, one paging cycle includes 8 paging frames with the frame numbers being 0 to 7 respectively, and one paging frame includes 1 paging occasion. In this case, paging occasions of paging frames that need to be monitored by each UE in the paging cycle are calculated according to the above calculation formula for calculating the paging occasion, and are shown in FIG. 2. The paging occasions of the UEs with the UE_IDs being 0 and 8 respectively are the paging occasion of the paging frame with the frame number of 0; the paging occasions of the UEs with the UE_IDs being 1 and 9 respectively are the paging occasion of the paging frame with the frame number of 1; the paging occasions of the UEs with the UE_IDs being 2 and 10 respectively are the paging occasion of the paging frame with the frame number of 2; the paging occasions of the UEs with the UE_IDs being 3 and 11 respectively are the paging occasion of the paging frame with the frame number of 3; the paging occasions of the UEs with the UE_IDs being 4 and 12 are the paging occasion of the paging frame with the frame number of 4; the paging occasions of the UEs with the UE_IDs being 5 and 13 respectively are the paging occasion of the paging frame with the frame number of 5; the paging occasions of the UEs with the UE_IDs being 6 and 14 respectively are the paging occasion of the paging frame with the frame number of 6; and the paging occasions of the UEs with the UE_IDs being 7 and 15 respectively are the paging occasion of the paging frame with the frame number of 7.

Figure 3:
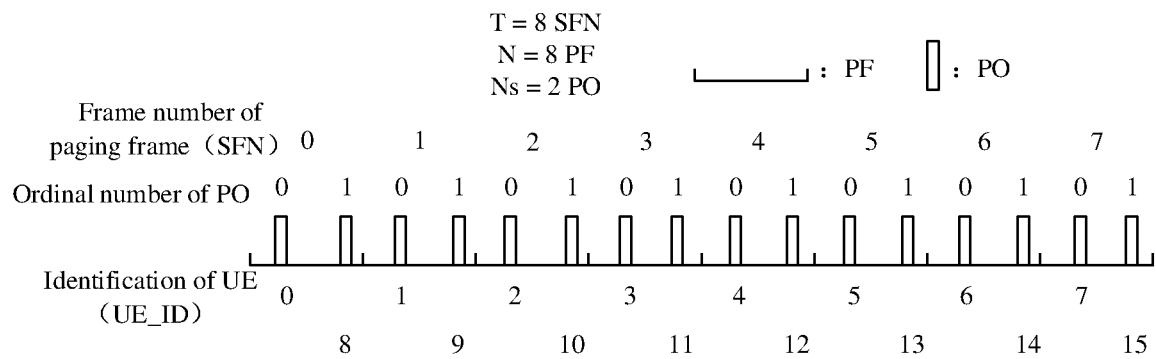
FIG. 3 is a schematic diagram of a paging frame within a paging cycle according to an example of the disclosure.

For another example, take the following as an example: there are 16 UEs with UE_IDs being 0 to 15 respectively, one paging cycle includes 8 paging frames with the frame numbers being 0 to 7 respectively, one paging frame includes 2 paging occasions, and the 2 paging occasions are the 0th paging occasion and the 1st paging occasion respectively. In this case, paging occasions of paging frames that need to be monitored by each UE in the paging cycle are calculated according to the above calculation formula for calculating the paging occasion, and are shown in FIG. 3. The paging occasion of the UE with the UE_ID being 0 is the 0th paging occasion of the paging frame with the frame number of 0; the paging occasion of the UE with the UE_ID being 8 is the 1st paging occasion of the paging frame with the frame number of 0; the paging occasion of the UE with the UE_ID being 1 is the 0th paging occasion of the paging frame with the frame number of 1; the paging occasion of the UE with the UE_ID being 9 is the 1st paging occasion of the paging frame with the frame number of 1; the paging occasion of the UE with the UE_ID being 2 is the 0th paging occasion of the paging frame with the frame number of 2; the paging occasion of the UE with the UE_ID being 10 is the 1st paging occasion of the paging frame with the frame number of 2; the paging occasion of the UE with the UE_ID being 3 is the 0th paging occasion of the paging frame with the frame number of 3; the paging occasion of the UE with the UE_ID being 11 is the 1st paging occasion of the paging frame with the frame number of 3; the paging occasion of the UE with the UE_ID being 4 is the 0th paging occasion of the paging frame with the frame number of 4; the paging occasion of the UE with the UE_ID being 12 is the 1st paging occasion of the paging frame with the frame number of 4; the paging occasion of the UE with the UE_ID being 5 is the 0th paging occasion of the paging frame with the frame number of 5; the paging occasion of the UE with the UE_ID being 13 is the 1st paging occasion of the paging frame with the frame number of 5; the paging occasion of the UE with the UE_ID being 6 is the 0th paging occasion of the paging frame with the frame number of 6; the paging occasion of the UE with the UE_ID being 14 is the 1st paging occasion of the paging frame with the frame number of 6; the paging occasion of the UE with the UE_ID being 7 is the 0th paging occasion of the paging frame with the frame number of 7; and the paging occasion of the UE with the UE_ID being 15 is the 1st paging occasion of the paging frame with the frame number of 7.

Based on the above calculation formula for calculating the paging occasions, more than one UE_ID may be evenly allocated to different paging occasions, and it is possible that the UEs of all the types may be allocated to the same paging occasion. For example, UE with a very high paging probability and UE with a very low paging probability are allocated to the same paging occasion. As such, when the paging message is sent at that paging occasion, all types of the UEs corresponding to that paging occasion needs to receive paging downlink control information (DCI) to decode the paging message. However, only the UE that really needs the paging message can receive the paging message correctly, while remaining UE will continue to be in an RRC idle state or an RRC inactive state. As such, unnecessary paging is caused. For example, as shown in FIG. 3, when only the UE with the UE_ID being 0 is really paged, the UE with the UE_ID being 8 is unnecessarily paged once. In the case that there are a large amount of UEs, one paging occasion will correspond to more UEs, which will cause more unnecessary paging.

Figure 4:
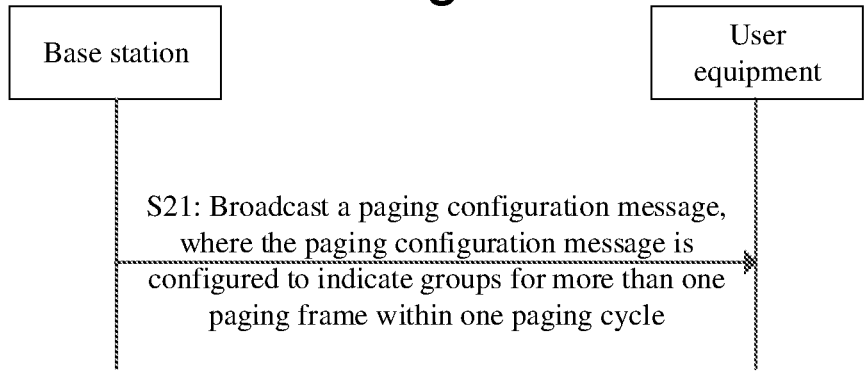
FIG. 4 is a flow diagram of a paging processing method according to an example of the disclosure.

As shown in FIG. 4, there is provided a paging processing method performed by a base station according to an example of the disclosure. The paging processing method includes step S21.

Step S21 includes broadcasting a paging configuration message, where the paging configuration message is configured to indicate groups for more than one paging frame within one paging cycle, each of the groups includes at least one paging frame, and each of the groups is configured to associate UEs of the same type.

The groups in the disclosure refer to more than one paging-frame group.

One group is one paging-frame group. One paging-frame group includes at least one paging frame, and one paging-frame group is configured to associate the UEs of the same type.

The base station in the example of the disclosure is an interface device for the user equipment to access the Internet. The base station may be various types of base stations, such as a 3G base station, a 4G base station, a 5G base station or other evolved base stations. The base station may also be a ground-network base station or a non-ground-network base station.

The user equipment in the example of the disclosure may be a mobile phone, a computer, a server, a transceiving device, a tablet device or a medical device, etc.

The paging configuration message carries group information for the more than one paging frame within one paging cycle.

For example, take the following as an example: one paging cycle includes 8 paging frames with the frame numbers being 0 to 7 respectively, the 8 paging frames within the paging cycle are divided into 3 groups, and the 3 paging-frame groups are $N_1$, $N_2$ and $N_3$ respectively. In this case, the paging configuration message carries information about the paging-frame groups $N_1$, $N_2$ and $N_3$ and information about the paging frames corresponding to the paging-frame groups $N_1$, $N_2$ and $N_3$ respectively.

The number of the paging-frame groups obtained by grouping the more than one paging frame within one paging cycle is greater than 1 and less than or equal to the number of the paging frames within one paging cycle. For example, the number of the paging-frame groups is 2, 3, 4 or 5, etc.

In the above example, $N_1$, $N_2$ and $N_3$ are configured to associate one type of UEs respectively.

The UEs of the same type may be UEs processing the same type of services, or UEs with the same wireless capability information, or UEs with the same device attribute, etc.

The UEs of the same type may also be UEs of the same type with the paging probability within a preset probability-threshold-value range. For example, in one example, a difference between the paging probabilities that any two UEs of the same type are paged is within the preset probability-threshold-value range.

In one example, the paging processing method includes obtaining type information of the UE.

The type information may be service information, wireless capability information, device attribute information and/or paging probability etc. mentioned in the above example.

The type of the UE may be determined based on the paging probability of the UE or the type information of the UE.

For example, the paging frames within one paging cycle may be grouped into 3 groups of $N_1$, $N_2$ and $N_3$, and $N_1$ may be configured to associate UEs with first type information, $N_2$ may be configured to associate UEs with second type information and $N_3$ may be configured to associate UEs with third type information. Alternatively, $N_1$ may also be configured to associate UEs with the paging probabilities being within a first threshold value range, $N_2$ may also be configured to associate UEs with the paging probabilities being within a second threshold value range, and $N_3$ may also be configured to associate UEs with the paging probabilities being within a third threshold value range, and so on.

In one example, broadcasting the paging configuration message in step S21 may also include: sending a system information block (SIB) carrying the paging configuration message.

In another example, broadcasting the paging configuration message in step S21 may also include: sending a master information block (MIB) carrying the paging configuration message.

As such, in the examples of the disclosure, paging configuration indications may be broadcast to the UEs through the system information such as the SIB and/or the MIB.

In some examples, the paging configuration message further carries at least one of the number of the paging frames included in the paging cycle and the number of the paging occasions included in the paging frames. As such, the UEs may be informed of various paging configurations of the base station by broadcasting the paging configuration message.

In the examples of the disclosure, the base station broadcasts the paging configuration message for indicating the groups for the more than one paging frame within one paging cycle, and each group is configured to associate the UEs of the same type. In this way, the UEs may be informed of the knowledge of the more than one group within one paging cycle, facilitating the UE to subsequently determine, based on its own type, which paging-frame group it should be located in.

Moreover, the grouping for the paging frames within the paging cycle according to the examples of the disclosure is based on the type of the UEs, and each group is configured to associate the UEs of the same type. In this way, when a paging message for paging the UE is sent subsequently, it is possible to significantly reduce the situation where only one or a few UEs in one group are actually paged while the other UEs actually need to receive the paging message as well although they are not paged actually. Thus, the occurrence of unnecessary paging is reduced, and resource overheads such as power consumption and energy consumption caused by the UE monitoring unnecessary paging messages are saved.

Figure 5:
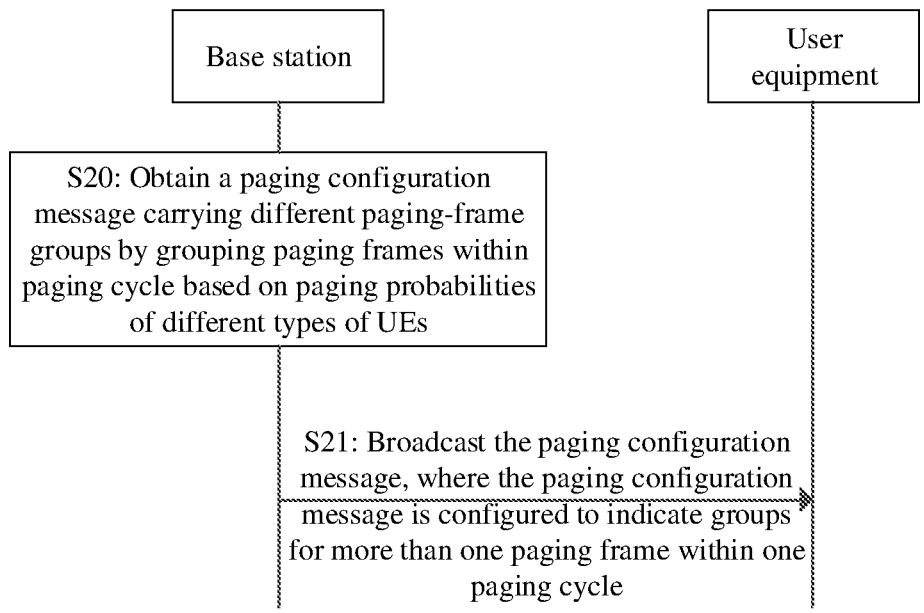
FIG. 5 is a flow diagram of a paging processing method according to an example of the disclosure.

As shown in FIG. 5, in some examples, the paging processing method further includes step S20.

Step S20 includes obtaining the paging configuration message carrying different paging-frame groups by grouping the paging frames within the paging cycle based on the paging probabilities of different types of UEs.

The paging probability of the UE refers to the number of times the UE is paged within preset time. For example, within the preset time, the number of times the UE with the UE_ID being 0 is paged is 2, the number of times the UE with the UE_ID being 1 is paged is 3, and the number of times the UE with the UE_ID being 2 is paged is 5, and so on.

The paging probability of the UE may further be a percentage. For example, the probability the UE with the UE_ID being 0 is paged is 10%, the probability the UE with the UE_ID being 1 is paged is 50%, and the probability the UE with the UE_ID being 2 is paged is 80%, and so on.

Figure 6:
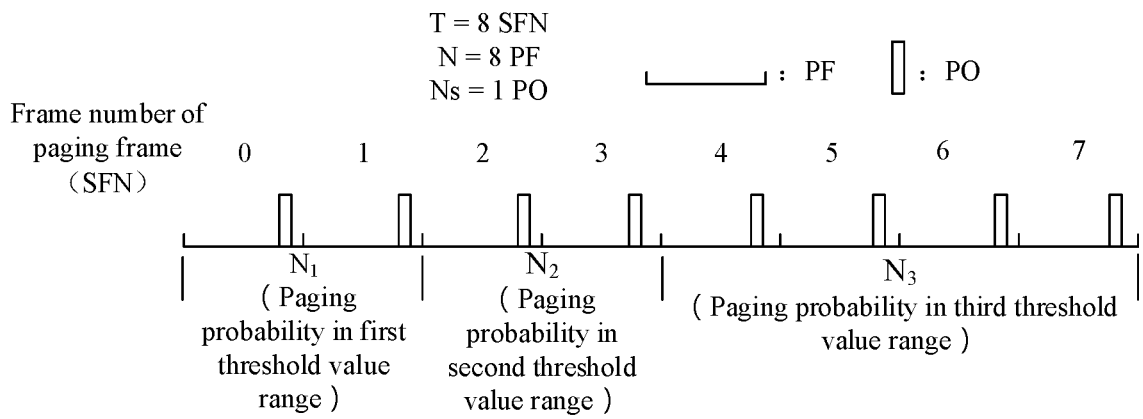
FIG. 6 is a schematic diagram illustrating the grouping of paging-frames within a paging cycle according to an example of the disclosure.

For example, there are M UEs in a wireless communication system, the M UEs may be grouped into 3 types based on different types, and the paging probabilities of the 3 types of UEs are a paging probability within a first threshold value range, a paging probability within a second threshold value range and a paging probability within a third threshold value range respectively. As such, based on the paging probabilities of the 3 types of UEs, the more than one paging frame within one paging cycle may be grouped into 3 groups. For example, as shown in FIG. 6, the 8 paging frames within one paging cycle are grouped into 3 paging-frame groups. The paging frames with the frame numbers being 0 to 1 are grouped into paging-frame group $N_1$, the paging frames with the frame numbers being 2 to 3 are grouped into paging-frame group $N_2$, and the paging frames with the frame numbers being 4 to 7 are grouped into paging-frame group $N_3$. The paging-frame groups $N_1$, $N_2$ and $N_3$ are configured to associate the UEs with the paging probabilities being within the first threshold value range, the UEs with the paging probabilities being within the second threshold value range and the UEs with the paging probabilities being within the third threshold value range respectively.

In an example, one paging frame corresponds to the paging probabilities of one type of UEs. One paging-frame group only includes one paging frame.

In another example, more than one paging frame corresponds to the paging probabilities of one type of UEs. One paging-frame group includes more than one paging frame.

In an example of the disclosure, a difference between the paging probabilities of any two UEs of the same type is within a preset probability range. In an example of the disclosure, one paging-frame group may be determined based on the paging probabilities of one type of UEs, and different paging-frame groups corresponding to different types of UEs may be determined based on the paging probabilities of different types of UEs.

In related art, UEs of all the types may be allocated to the same paging frame, that is, a UE with a relatively high paging probability and a UE with a relatively low paging probability may be allocated to the same paging frame or the same paging occasion of the same paging frame. As such, each paging frame or each paging occasion of each paging frame corresponds to a UE with the relatively high paging probability, so that the number of times a paging message is initiated at that paging frame or at that paging occasion of that paging frame is relatively high. As such, a UE with the relatively low paging probability corresponding to that paging frame or to that paging occasion of that paging frame also needs to monitor the paging message for a large number of times, thus causing a large amount of unnecessary paging.

In contrast, in the example of the disclosure, the more than one paging frame within one paging cycle may be grouped based on the paging probabilities of different types of UEs, and thus UEs whose paging probabilities do not differ significantly may be grouped into the same paging-frame group. For example, at least two UEs both with relatively low paging probabilities are grouped into one paging-frame group, and at least two UEs both with relatively high paging probabilities are grouped into another paging-frame group. As such, the number of times a paging message is initiated on the paging-frame group corresponding to the UEs with the relatively low paging probability is relatively low, so that the UEs corresponding to that paging-frame group will monitor the paging message for a small number of times, thus greatly reducing unnecessary paging.

In some examples, the paging-frame groups include a specific paging-frame group. The specific paging-frame group is associated with UEs with the paging probabilities unable to be determined; and/or, the specific paging-frame group is associated with UEs with the paging probabilities being lower than a preset value.

Figure 7:
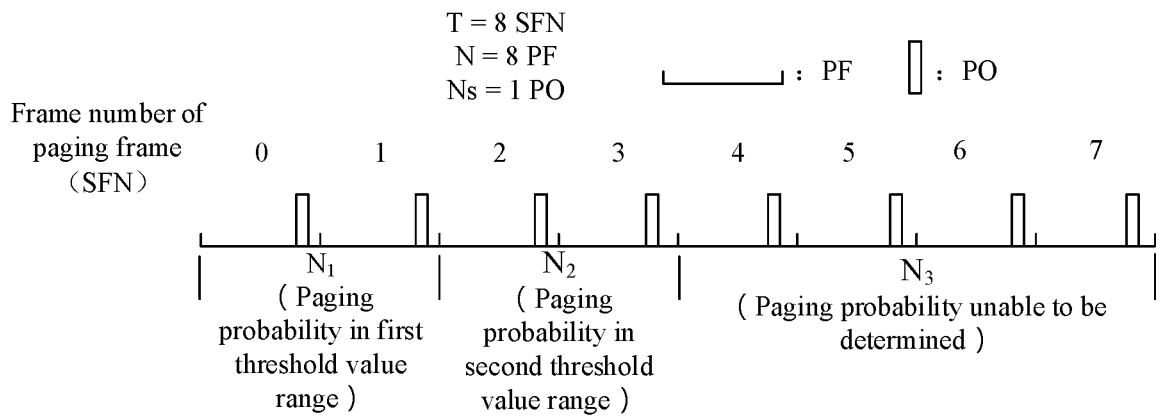
FIG. 7 is a schematic diagram illustrating the grouping of paging-frames within a paging cycle according to an example of the disclosure.

For example, as shown in FIG. 7, the paging frames within one paging cycle are grouped into 3 paging-frame groups based on the paging probabilities of 3 types of UEs, the 3 paging-frame groups are paging-frame groups $N_1$, $N_2$ and $N_3$ respectively. The paging probabilities of one of the 3 types of UEs cannot be determined or is extremely low, and this type of UEs may be associated with the paging-frame group $N_3$. The paging probabilities of the other two types of UEs are the paging probabilities within the first threshold value range and the paging probabilities within the second threshold value range, and these two types of UEs may be associated with the paging-frame groups $N_1$ and $N_2$ respectively.

The UEs with the paging probabilities unable to be determined may be UEs with the paging probabilities not stored or obtained in advance, or UEs that newly access a communication network, or UEs with the paging probabilities being very high or very low, and so on.

In an example of the disclosure, one paging-frame group may be determined for the UEs with the paging probabilities unable to be determined or for the UEs with the paging probabilities being lower than a preset value, allowing for more wireless communication application scenarios and more accurate grouping of the more than one paging frame within one paging cycle.

Figure 8:
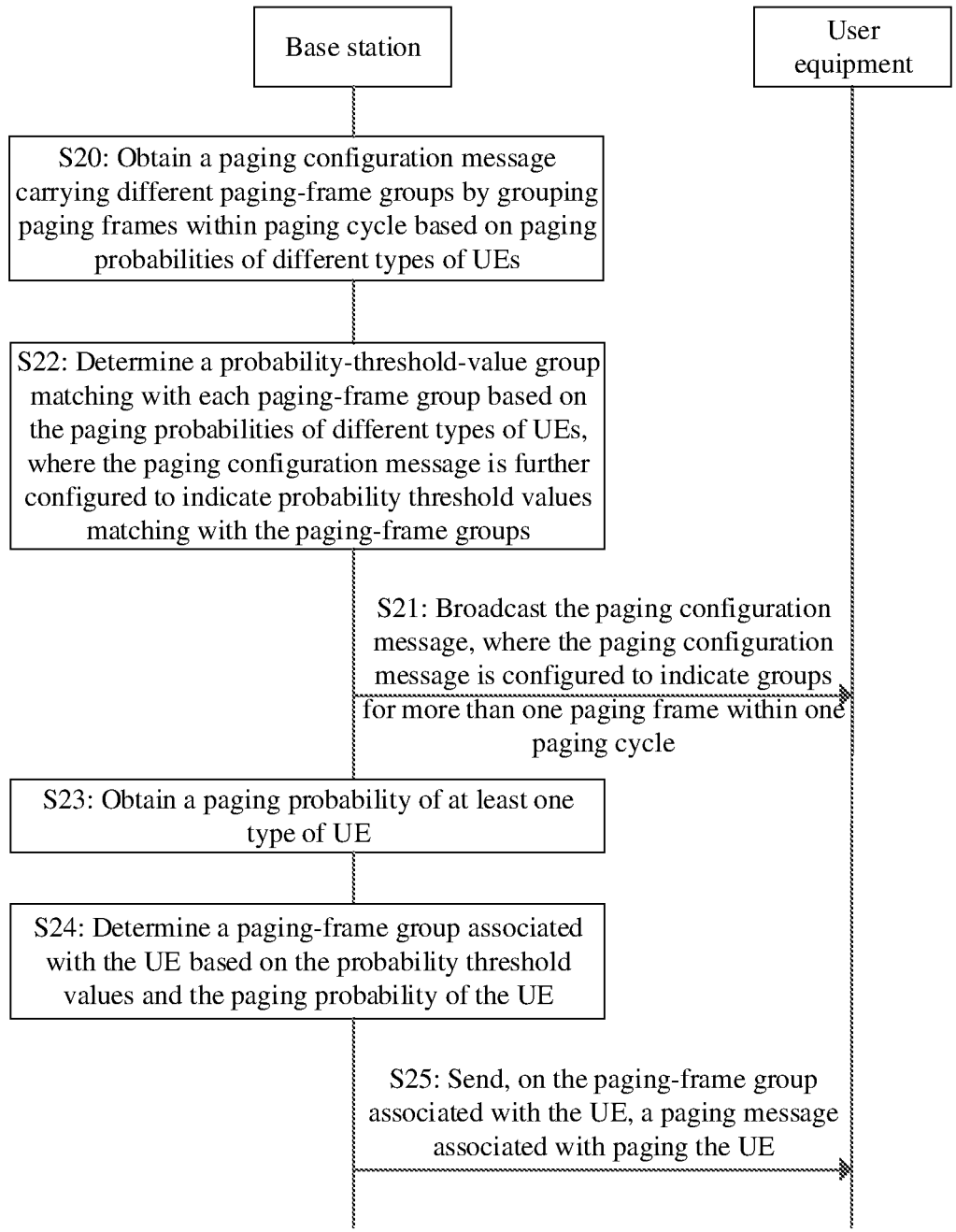
FIG. 8 is a flow diagram of a paging processing method according to an example of the disclosure.

As shown in FIG. 8, in some examples, the paging processing method further includes step S22.

Step S22 includes determining a probability-threshold-value group matching with each paging-frame group based on the paging probabilities of different types of UEs, where the paging configuration message is further configured to indicate probability threshold values matching with the paging-frame groups.

The probability-threshold-value group includes at least one probability threshold value.

In one example, in the case that the paging-frame groups within one paging cycle include the specific paging-frame group, the number of the probability threshold values included in the probability-threshold-value group is the number of the paging-frame groups minus 1.

In another example, in the case that the paging-frame groups within one paging cycle include one specific paging-frame group, the number of the probability threshold values included in the probability-threshold-value group is the number of the paging-frame groups minus 2.

In one example, one probability threshold value may be determined based on the paging probabilities corresponding to two adjacent paging-frame groups. These paging-frame groups do not include the specific paging-frame group.

For example, on the basis of the example shown in FIG. 6 above, 2 probability threshold values may be determined based on the 3 paging-frame groups. That is, a first probability threshold value may be determined based on the paging probabilities within the first threshold value range corresponding to the paging-frame group $N_1$ and the paging probabilities within the second threshold value range corresponding to the paging-frame group $N_2$, and a second probability threshold value may be determined based on the paging probabilities within the second threshold value range corresponding to the paging-frame group $N_2$ and the paging probabilities within the third threshold value range corresponding to the paging-frame group $N_3$. For example, the first threshold value range may be 0 to 29%, the second threshold value range may be 30% to 60%, and the third threshold value range may be 61% to 100%, so it may be determined that the first probability threshold value is 30%, and the second probability threshold value is 60%.

For example, on the basis of the example shown in FIG. 7 above, 1 probability threshold value may be determined based on the 3 paging-frame groups. That is, one probability threshold value may be determined based on the paging probabilities within the first threshold value range corresponding to the paging-frame group $N_1$ and the paging probabilities within the second threshold value range corresponding to the paging-frame group $N_2$. For example, the first threshold value range may be 0 to 49%, and the second threshold value range may be 50% to 90%, so it may be determined that the probability threshold value is 50%.

In the examples of the disclosure, the base station may determine the probability-threshold-value group matching with each paging-frame group based on the paging probabilities of different types of UEs, and may inform the UE of the range of the paging probabilities of the UE corresponding to each paging-frame group when sending these probability threshold values to the UE, facilitating the UE to subsequently determine, based on these probability threshold values, which paging-frame group the UE should be located in.

Referring to FIG. 8 again, in some examples, the paging processing method further includes steps S23 to S25.

Step S23 includes obtaining a paging probability of at least one type of UEs.

Step S24 includes determining a paging-frame group associated with the UE based on the probability threshold values and the paging probability of the UE.

Step S25 includes sending, on the paging-frame group associated with the UE, a paging message associated with paging the UE.

The UE may be any type of UE.

In one example, obtaining the paging probability of the UE in step S23 may include obtaining the paging probability of the UE sent by a core-network entity.

As such, the base station may obtain, based on the core-network entity, the paging probability of the UE not to be paged.

In another example, the paging processing method further includes: sending the paging probability of the UE to the UE, after the base station obtains the paging probability of the UE sent by the core-network entity. This allows the UE to know its own paging probability.

For example, on the basis of the example shown in FIG. 6 above, the paging frames within one paging cycle are grouped into the paging-frame groups $N_1$, $N_2$ and $N_3$. The three paging-frame groups correspond to two probability threshold values, namely the first probability threshold value of 30% and the second probability threshold value of 60%. In the case that the obtained paging probability of the UE is 20%, that is, the paging probability of the UE is less than the first probability threshold value, it is determined that the paging-frame group associated with the UE is $N_1$. In the case that the obtained paging probability of the UE is 50%, that is, the paging probability of the UE is greater than the first probability threshold value and less than the second probability threshold value, it is determined that the paging-frame group associated with the UE is $N_2$. In the case that the obtained paging probability of the UE is 80%, that is, the paging probability of the UE is greater than the second probability threshold value, it is determined that the paging-frame group associated with the UE is $N_3$.

For example, on the basis of the example shown in FIG. 7 above, the paging-frames within one paging cycle are grouped into the paging-frame groups $N_1$, $N_2$ and $N_3$. The paging-frame group $N_3$ is a paging-frame group associated with the UE with the paging probability unable to be determined, and one probability threshold value is determined, i.e. 50%. In the case that the obtained paging probability of the UE is 40%, that is, the paging probability of the UE is less than the probability threshold value, it is determined that the paging-frame group associated with the UE is $N_1$. In the case that the obtained paging probability of the UE is 70%, that is, the paging probability of the UE is greater than the probability threshold value, it is determined that the paging-frame group associated with the UE is $N_2$.

In the examples of the disclosure, the paging-frame group associated with the UE may be determined based on the paging probability of the UE and the probability threshold value. As such, the paging message for paging the UE is sent on the paging-frame group associated with the UE. On the one hand, the UE is enabled to monitor the paging message. On the other hand, since other UEs corresponding to the paging-frame group associated with the UE has a little difference with the UE in paging probability, the number of times the UE is paged can be reduced to a certain extent as compared with the related art that the UE is allocated to the same paging-frame group as other UEs with a relatively high paging probability, so that unnecessary paging is reduced.

Figure 9:
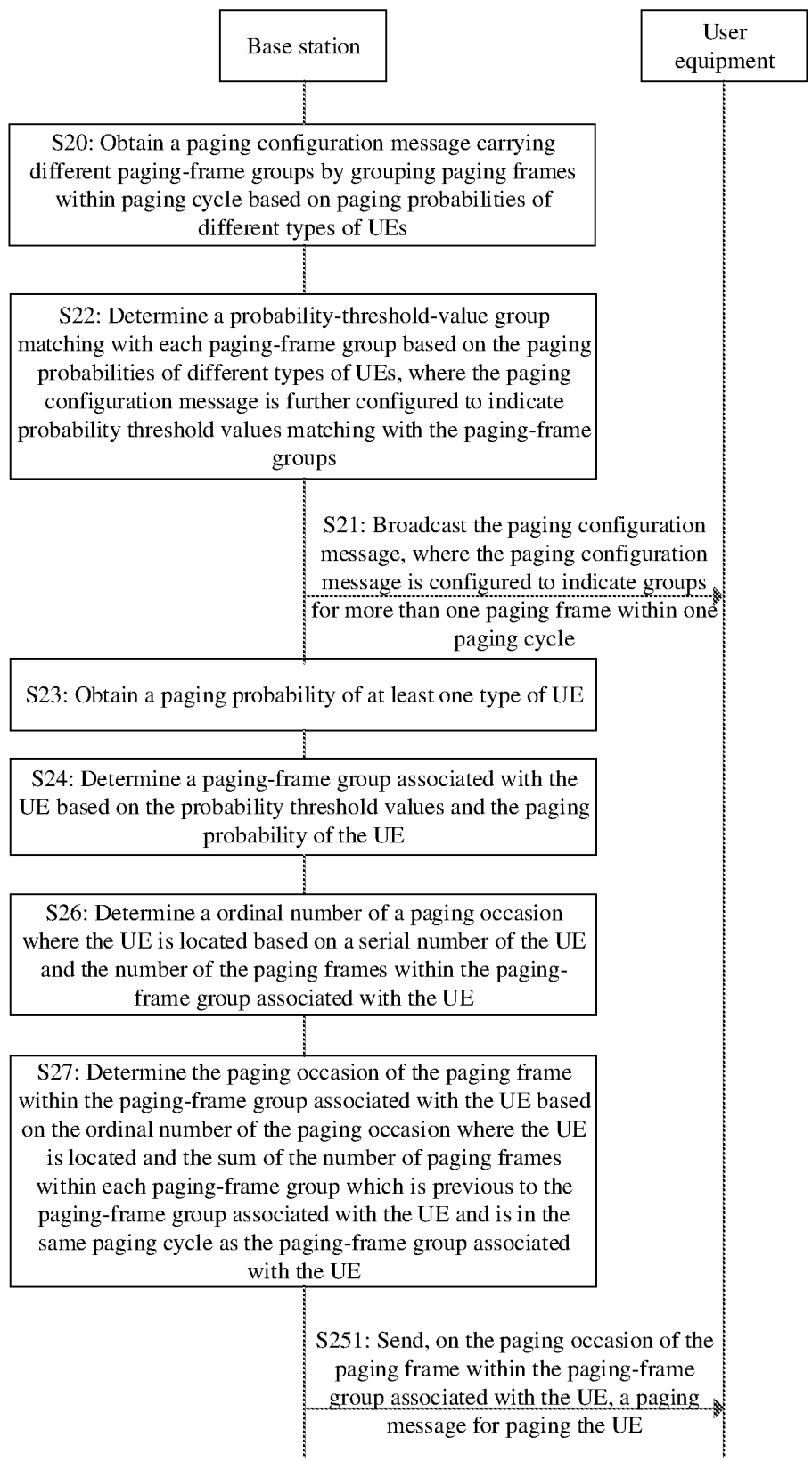
FIG. 9 is a flow diagram of a paging processing method according to an example of the disclosure.

Referring to FIG. 9 again, in some examples, the paging processing method further includes steps S26 and S27.

Step S26 includes determining an ordinal number of a paging occasion where the UE is located based on a serial number of the UE and the number of the paging frames within the paging-frame group associated with the UE.

Step S27 includes determining the paging occasion of the paging frame within the paging-frame group associated with the UE, based on the ordinal number of the paging occasion where the UE is located and the sum of the number of paging frames within each paging-frame group which is previous to the paging-frame group associated with the UE and is in the same paging cycle as the paging-frame group associated with the UE.

The serial number of the UE may be a UE identification. For example, the serial number of the UE may be the UE_ID in the above examples, and the UE_ID may be obtained based on an IMSI.

The serial number of the UE may also be a sequential numbering of the UE in a wireless communication system. The serial number of the UE just needs to meet the requirement that the serial number of the UE can identify the UE uniquely and more than one UE are sequentially numbered in the wireless communication system. The type or numbering form of the serial number of the UE is not limited in the disclosure.

A means for implementing step S26 is:

$$i\_s = \text{floor}\left(\frac{\text{UE\_ID}}{N_i}\right) \bmod Ns$$

i_s refers to the ordinal number of the paging occasion; UE_ID refers to the serial number of the UE; $N_i$ refers to i paging frames included in the paging-frame group; Ns refers to paging occasions included in one paging frame; "floor" function refers to a round-down function; and "mod" function refers to a function for solving a remainder.

A means for implementing step S27 includes: obtaining a starting-monitoring frame ($SFN_0$) associated with the UE; obtaining the paging frame where the UE is located, based on a frame number of the starting-monitoring frame and the sum of the number of paging frames within each paging-frame group which is previous to the paging-frame group associated with the UE and is in the same paging cycle as the paging-frame group associated with the UE; and determining the paging occasion of the paging frame within the paging-frame group associated with the UE based on the paging frame where the UE is located and the ordinal number of the paging occasion where the UE is located.

In practical applications, the starting-monitoring frame of the UE refers to a starting-monitoring frame of the UE within the associated paging-frame group.

A means for obtaining the starting-monitoring frame associated with the UE is:

$$SFN_0 = (T \text{ div } N) \times (UE\_ID \text{ mod } N_i)$$

T refers to the paging cycle, N refers to the number of the paging frames included in one paging cycle, the "div" function refers to an exact-division function, and (T div N) is 1.

A means for obtaining the paging frame where the UE is located based on the frame number of the starting-monitoring frame and the sum of the number of paging frames within each paging-frame group which is previous to the paging-frame group associated with the UE and is in the same paging cycle as the paging-frame group associated with the UE is:

$$SFN_{Ni} = SFN_0 + (T \text{ div } N) \times \left( \sum_{j=1,\ldots i-1} N_j \right)$$

$SFN_{Ni}$ refers to the paging frame within the paging-frame group associated with the UE, and $$\sum_{j=1,\ldots i-1} N_j$$

refers to the sum of the number of the paging frames within each paging-frame group which is previous to the paging-frame group associated with the UE and is in the same paging cycle as the paging-frame group associated with the UE.

In one example, $SFN_0$=the said+PF_offset. PF_offset refers to a frame offset of the paging frame.

For example, there are 16 UEs with the UE_IDs being 0 to 15 respectively, one paging cycle includes 8 paging frames with the frame numbers being 0 to 7 respectively, one paging frame includes 1 paging occasion, the paging frames within one paging cycle are grouped into 3 groups which are the paging-frame groups $N_1$, $N_2$ and $N_3$ respectively, and the number of the paging frames within the paging-frame groups $N_1$, $N_2$ and $N_3$ are 2, 2 and 4 respectively.

According to the paging probabilities of the 16 UEs with the UE_IDs being 0 to 15 respectively, it is determined that the groups corresponding to the 16 UEs respectively are as shown in Table 1 below:

TABLE 1

| Paging-frame group | Serial number of the UE | The number of the paging frames corresponding to the paging-frame group |
|---|---|---|
| Paging-frame group $N_1$ | 0, 1, 2, 3 | $N_1 = 2$ |
| Paging-frame group $N_2$ | 4, 5, 6, 7 | $N_2 = 2$ |
| Paging-frame group $N_3$ | 8, 9, 10, 11, 12, 13, 14, 15 | $N_3 = 4$ |

On the basis of the above calculation formula $SFN_0$=(T div N)×(UE_ID mod $N_i$) for the starting-monitoring frame and the above calculation formula $$i\_s = \text{floor}\left(\frac{UE\_ID}{N_i}\right) \text{ mod } Ns$$

for the paging occasion, the frame numbers of the starting-monitoring frames and the ordinal numbers of the paging occasions corresponding to the 16 UEs respectively are as shown in Table 2 below:

TABLE 2

| Serial number of UE | 0 | 1 | 2 | 3 | 4 | 5 | 6 | 7 |
|---|---|---|---|---|---|---|---|---|
| Frame number of starting-monitoring frame | 0 | 1 | 0 | 1 | 0 | 1 | 0 | 1 |
| Ordinal number of paging occasion | 0 | 0 | 0 | 0 | 0 | 0 | 0 | 0 |
| Serial number of UE | 8 | 9 | 10 | 11 | 12 | 13 | 14 | 15 |
| Frame number of starting-monitoring frame | 0 | 1 | 2 | 3 | 0 | 1 | 2 | 3 |
| Ordinal number of paging occasion | 0 | 0 | 0 | 0 | 0 | 0 | 0 | 0 |

On the basis of the frame numbers of the starting-monitoring frames of the 16 UEs and the sum of the number of the paging frames within the paging-frame groups previous to the paging-frame groups where the 16 UEs are located respectively, it is determined that the frame numbers of the paging frames where the 16 UEs are located respectively and the ordinal numbers of the paging occasions where the 16 UEs are located respectively are as shown in Table 3 below:

TABLE 3

| Serial number of UE | 0 | 1 | 2 | 3 | 4 | 5 | 6 | 7 |
|---|---|---|---|---|---|---|---|---|
| Frame number of paging frame | 0 | 1 | 0 | 1 | 2 | 3 | 2 | 3 |
| Ordinal number of paging occasion | 0 | 0 | 0 | 0 | 0 | 0 | 0 | 0 |
| Serial number of UE | 8 | 9 | 10 | 11 | 12 | 13 | 14 | 15 |
| Frame number of paging frame | 4 | 5 | 6 | 7 | 4 | 5 | 6 | 7 |
| Ordinal number of paging occasion | 0 | 0 | 0 | 0 | 0 | 0 | 0 | 0 |

Figure 10:
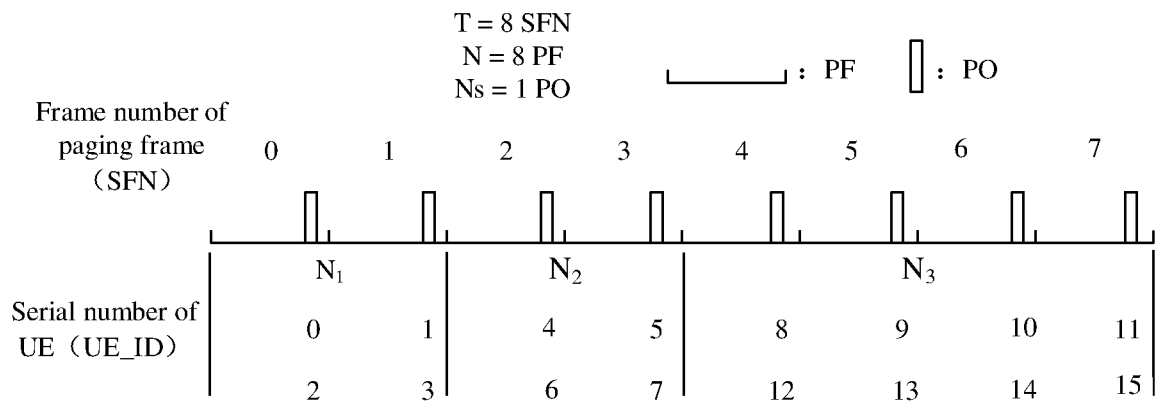
FIG. 10 is a schematic diagram of determining a paging occasion based on a paging probability according to an example of the disclosure.

The paging occasions of the paging frames where the 16 UEs are located corresponding to Table 3 are as shown in FIG. 10.

Since the paging-frame group where the UEs with the UE_IDs respectively being 0, 1, 2 and 3 are located is $N_1$, and there is no paging-frame group previous to $N_1$ within the paging cycle, the paging frames associated with the UEs with the UE_IDs respectively being 0, 1, 2 and 3 are the starting-monitoring frames of the paging-frame groups associated with these UEs respectively. Since the paging-frame group where the UEs with the UE_IDs respectively being 4, 5, 6 and 7 are located is $N_2$, there is the paging-frame group $N_1$ previous to $N_2$ within the paging cycle, and the number of the paging frames included in $N_1$ is 2, so the paging frames associated with the UEs with the UE_IDs respectively being 4, 5, 6 and 7 are the frame numbers of the starting-monitoring frames of the paging-frame groups associated with these UEs plus 2, respectively. Since the paging-frame group where the UEs with the UE_IDs respectively being 8, 9, 10, 11, 12, 13, 14 and 15 are located is $N_3$, there are the paging-frame groups $N_1$ and $N_2$ previous to $N_3$ within the paging cycle, and the number of the paging frames included in each of $N_1$ and $N_2$ is 2, so the paging frames associated with the UEs with the UE_IDs respectively being 8, 9, 10, 11, 12, 13, 14 and 15 are the frame numbers of the starting-monitoring frames of the paging-frame groups associated with these UEs plus 4, respectively. Calculation of the paging frames of the 16 UEs is as shown in Table 4 below.

TABLE 4

| | |
|---|---|
| Paging-frame group $N_1$ | Corresponding frame number of the paging frame is frame number of the starting-monitoring frame |
| Paging-frame group $N_2$ | Corresponding frame number of the paging frame is: frame number of the starting-monitoring frame + the number of paging frames within $N_1$ |
| Paging-frame group $N_3$ | Corresponding frame number of the paging frame is: frame number of the starting-monitoring frame + the number of paging frames within $N_1$ + the number of paging frames within $N_2$ |

For example, in the above example, there are 16 UEs with the UE_IDs respectively being 0 to 15, one paging cycle includes 8 paging frames with the frame numbers being 0 to 7 respectively, one paging frame includes 2 paging occasions which are 0 and 1 respectively, the paging frames within one paging cycle are grouped into 3 groups which are the paging-frame groups $N_1$, $N_2$ and $N_3$ respectively, and the number of the paging frames within the paging-frame groups $N_1$, $N_2$ and $N_3$ are 2, 2 and 4 respectively.

According to the paging probabilities of the 16 UEs with the UE_IDs respectively being 0 to 15, it is determined that the groups corresponding to the 16 UEs respectively are as shown in the above Table 1.

On the basis of the above calculation formula $SFN_0 = (T \text{ div } N) \times (UE\_ID \bmod N_i)$ for the starting-monitoring frame and above calculation formula $$i\_s = \text{floor}\left(\frac{UE\_ID}{N_i}\right) \bmod Ns$$

for the paging occasion, the frame numbers of the starting-monitoring frames and the ordinal numbers of the paging occasions corresponding to the 16 UEs respectively are as shown in Table 5 below:

TABLE 5

| Serial number of UE | 0 | 1 | 2 | 3 | 4 | 5 | 6 | 7 |
|---|---|---|---|---|---|---|---|---|
| Frame number of the starting-monitoring frame | 0 | 1 | 0 | 1 | 0 | 1 | 0 | 1 |
| Ordinal number of paging occasion | 0 | 0 | 1 | 1 | 0 | 0 | 1 | 1 |
| Serial number of UE | 8 | 9 | 10 | 11 | 12 | 13 | 14 | 15 |
| Frame number of the starting-monitoring frame | 0 | 1 | 2 | 3 | 0 | 1 | 2 | 3 |
| Ordinal number of paging occasion | 0 | 0 | 0 | 0 | 1 | 1 | 1 | 1 |

On the basis of the frame numbers of the starting-monitoring frames of the 16 UEs and the sum of the number of the paging frames within the paging-frame groups previous to the paging-frame groups where the 16 UEs are respectively located, it is determined that the frame numbers of the paging frames and the ordinal numbers of the paging occasions of the 16 UEs are as shown in Table 6 below:

TABLE 6

| Serial number of UE | 0 | 1 | 2 | 3 | 4 | 5 | 6 | 7 |
|---|---|---|---|---|---|---|---|---|
| Frame number of the paging frame | 0 | 1 | 0 | 1 | 2 | 3 | 2 | 3 |
| Ordinal number of paging occasion | 0 | 0 | 1 | 1 | 0 | 0 | 1 | 1 |
| Serial number of UE | 8 | 9 | 10 | 11 | 12 | 13 | 14 | 15 |
| Frame number of the paging frame | 4 | 5 | 6 | 7 | 4 | 5 | 6 | 7 |
| Ordinal number of paging occasion | 0 | 0 | 0 | 0 | 1 | 1 | 1 | 1 |

Figure 11:
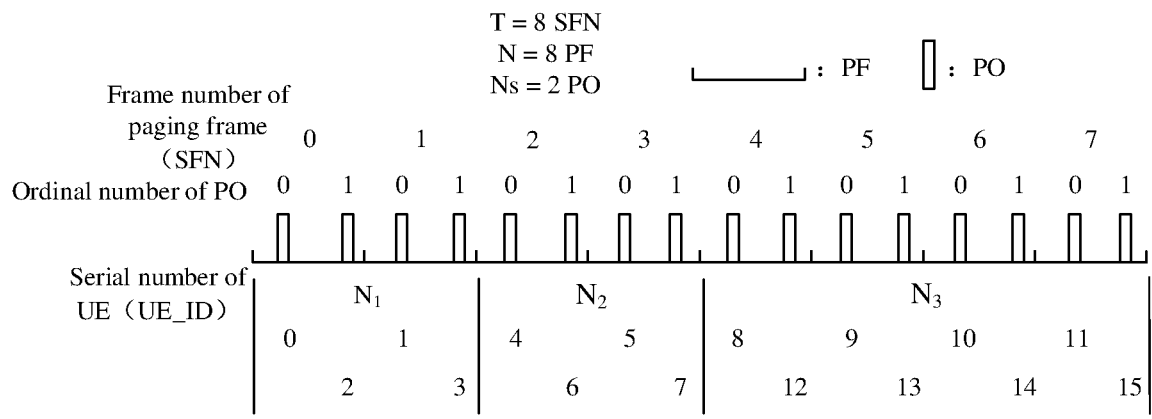
FIG. 11 is a schematic diagram of determining a paging occasion based on a paging probability according to an example of the disclosure.

The paging occasions of the paging frames where the 16 UEs are located corresponding to Table 6 are as shown in FIG. 11.

In the examples of the disclosure, the paging occasion of a specific paging frame of the UE in the paging-frame group may be determined based on the serial number of the UE, the paging-frame group associated with the UE and the like. As such, the base station may send a paging message according to the fact that the UE really needs to be paged, thus improving the accuracy of sending the paging message.

Moreover, in the examples of the disclosure, the paging occasions are allocated based on the types of the UEs, so that UEs of the same type (i.e., UEs whose paging probabilities do not differ significantly) are allocated to the same paging occasion as far as possible, greatly reducing unnecessary paging caused by the situation that UE with a low paging probability is frequently paged when it does not really need to be paged, and saving the power consumption and energy consumption of the UE.

Referring to FIG. 9 again, in some examples, step S25 above includes step S251.

Step S251 includes sending, on the paging occasion of the paging frame within the paging-frame group associated with the UE, the paging message for paging the UE.

For example, for the UE with the UE_ID being 8 corresponding to the example in Table 3 above, the base station may send a paging message at the 0th paging occasion of the paging frame with the frame number of 4. For the UE with the UE_ID being 12 corresponding to the example in Table 3 above, the base station may send a paging message at the 1st paging occasion of the paging frame with the frame number of 4.

In the examples of the disclosure, the paging message for paging the UE may be sent on the paging occasion of the specific paging frame within the paging-frame group associated with each UE, so that the UE may accurately monitor its own paging message on that paging occasion of that paging frame, and unnecessary paging caused by other UEs monitoring that paging message can be reduced.

It should be noted that, a paging processing method below is performed by a UE, similar to the description of the paging processing method performed by the base station above. For technical details not disclosed in an example of the paging processing method performed by the UE, please refer to the description of the examples of the paging processing method performed by the base station in the disclosure, which is not described in detail here.

Figure 12:
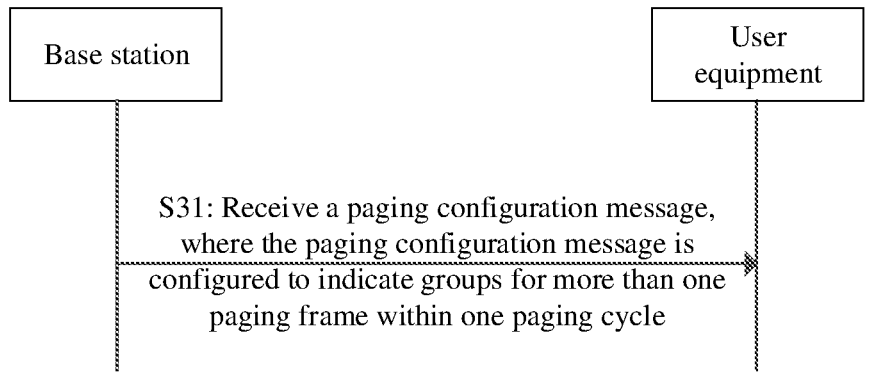
FIG. 12 is a flow diagram of a paging processing method according to an example of the disclosure.

As shown in FIG. 12, there is provided a paging processing method performed by a UE. The paging processing method includes step S31.

Step S31 includes receiving a paging configuration message, where the paging configuration message is configured to indicate groups for more than one paging frame within one paging cycle, each of the groups includes at least one paging frame, and each of the groups is configured to associate UEs of the same type.

The groups refer to more than one paging-frame groups.

One group is one paging-frame group. One paging-frame group includes at least one paging frame, and one paging-frame group is configured to associate the UEs of the same type.

In one example, receiving the paging configuration message in step S31 may be based on an SIB sent by a base station, where the SIB carries the paging configuration message.

In another example, receiving the paging configuration message in step S31 may be based on an MIS sent by the base station, where the MIB carries the paging configuration message.

In some examples, the paging configuration message is further configured to indicate at least one of: the number of the paging frames included in the paging cycle and the number of paging occasions included in the paging frames.

In the examples of the disclosure, by obtaining the paging configuration message configured by the base station, the UE may be informed of the knowledge of the groups for the more than one paging frame within one paging cycle, facilitating the UE to subsequently determine, based on its own type, which paging-frame group it should be located in.

In the examples of the disclosure, each paging-frame group is configured to associate the UEs of the same type. In this way, when the UE monitors the paging message subsequently, it is possible to reduce unnecessary paging caused by the situation that the UE does not need to be paged but needs to frequently monitor the paging message because the UE is at the same paging frame or at the same paging occasion of the paging frame with the other UEs and the other UEs needs to be frequently paged, and thus saving resource overheads such as power consumption and energy consumption caused by the UE monitoring unnecessary paging messages.

In some examples, the paging configuration message is further configured to indicate probability threshold values matching with the paging-frame groups.

In another examples, the paging configuration message is further configured to indicate threshold value ranges of paging probabilities corresponding to the paging-frame groups.

In some examples, the paging-frame groups include a specific paging-frame group. The specific paging-frame group is associated with UEs with the paging probabilities unable to be determined; and/or, the specific paging-frame group is associated with UEs with the paging probabilities being lower than a preset value.

In some examples, the paging processing method further includes: obtaining a paging probability of the UE; determining a paging-frame group associated with the UE based on the probability threshold values and the paging probability of the UE; and monitoring, on the paging-frame group associated with the UE, a paging message for paging the UE sent by a base station.

Obtaining the paging probability of the UE may include receiving the paging probability of the UE sent by the base station.

In the examples of the disclosure, a manner for the UE to determine the paging-frame group where the UE is located is similar to the manner for the base station to determine the paging-frame group where the UE is located, just needing to make the UE at the base-station side equivalent to the UE at the UE side.

In some examples, the paging processing method further includes at least one of: determining the number of the paging frames within the paging-frame group associated with the UE based on the paging configuration message; and determining, based on the paging configuration message, the number of paging frames within each paging-frame group which is previous to the paging-frame group associated with the UE and is in the same paging cycle as the paging-frame group associated with the UE.

Figure 13:
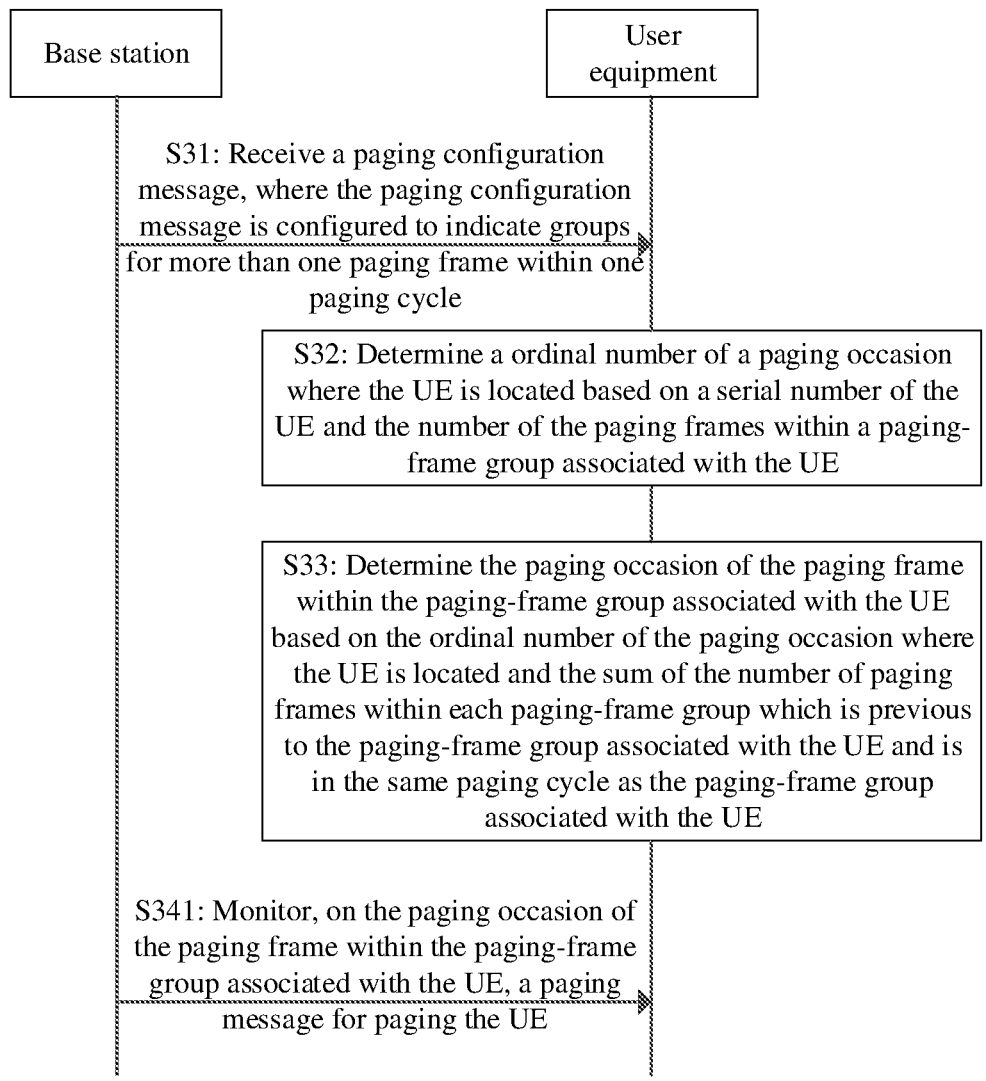
FIG. 13 is a flow diagram of a paging processing method according to an example of the disclosure.

As shown in FIG. 13, in some examples, the paging processing method includes steps S32 and S33.

Step S32 includes determining an ordinal number of a paging occasion where the UE is located based on a serial number of the UE and the number of the paging frames within the paging-frame group associated with the UE.

Step S33 includes determining the paging occasion of the paging frame within the paging-frame group associated with the UE, based on the ordinal number of the paging occasion where the UE is located and the sum of the number of paging frames within each paging-frame group which is previous to the paging-frame group associated with the UE and is in the same paging cycle as the paging-frame group associated with the UE.

In the examples of the disclosure, a manner for the UE to determine the ordinal number of the paging occasion where the UE is located is similar to the manner for the base station to determine the ordinal number of the paging occasion where the UE is located, and a manner for the UE to determine the paging occasion of the paging frame within the paging-frame group associated with the UE is similar to the manner for the base station to determine the paging occasion of the paging frame within the paging-frame group associated with the UE, just needing to make the UE at the base-station side equivalent to the UE at the UE side.

For example, a means for implementing the above step S32 is:

$$i\_s = \text{floor}\left(\frac{UE\_ID}{N_i}\right) \mod Ns$$

For another example, a means for implementing the above step S33 includes: obtaining a starting-monitoring frame (SFN$_0$) associated with the UE; obtaining the paging frame where the UE is located, based on a frame number of the starting-monitoring frame and the sum of the number of paging frames within each paging-frame group which is previous to the paging-frame group associated with the UE and is in the same paging cycle as the paging-frame group associated with the UE; and determining the paging occasion of the paging frame within the paging-frame group associated with the UE based on the paging frame where the UE is located and the ordinal number of the paging occasion where the UE is located.

In some examples, monitoring, on the paging-frame group associated with the UE, the paging message for paging the UE sent by the base station includes step S341.

Step S341 includes monitoring, on the paging occasion of the paging frame within the paging-frame group associated with the UE, the paging message for paging the UE.

A specific example is provided below in combination with any example above.

Figure 14:
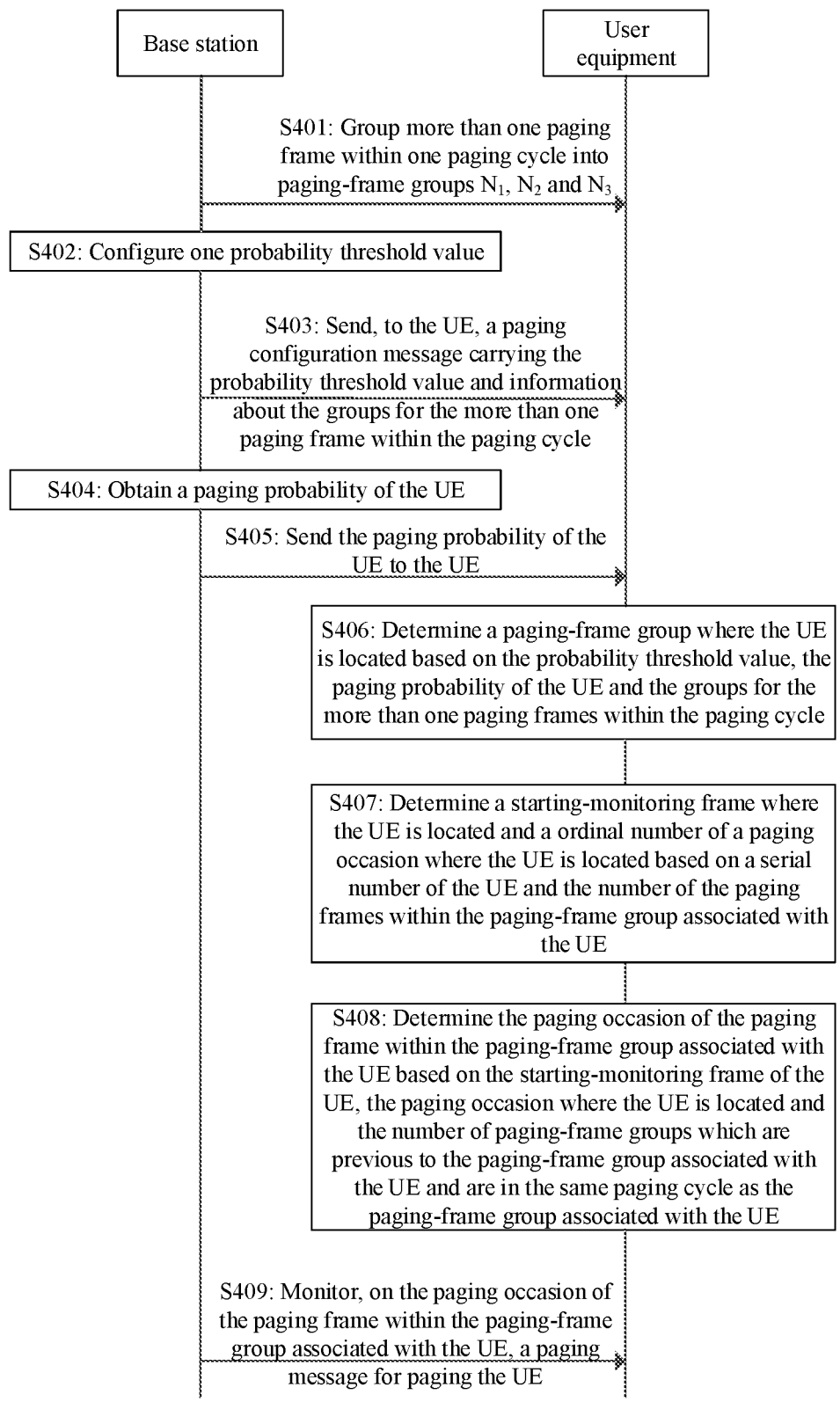
FIG. 14 is a flow diagram of a paging processing method according to an example of the disclosure.

As shown in FIG. 14, there is further provided a paging processing method according to an example of the disclosure. The paging processing method includes steps S401 to S409.

Step S401 includes grouping more than one paging frame within one paging cycle into paging-frame groups $N_1$, $N_2$ and $N_3$.

In an example, there are 16 UEs with UE_IDs being 0 to 15 respectively, one paging cycle includes 8 paging frames with frame numbers of 0 to 7 respectively, and one paging frame includes 1 paging occasion. A base station groups the 8 paging-frames into the paging-frame groups $N_1$, $N_2$ and $N_3$. The paging-frame group $N_1$ is a paging-frame group associating a paging probability in a first threshold value range, the paging-frame group $N_2$ is a paging-frame group associating a paging probability in a second threshold value range, and the paging-frame group $N_3$ is a specific paging-frame group associating UEs with the paging probabilities unable to be determined. The grouping of the paging cycle may refer to FIG. 7.

One paging-frame group is configured to associate UEs of the same type.

Step S402 includes configuring one probability threshold value.

In an example, the base station determines the probability threshold value based on the paging probabilities within the first threshold value range and the paging probabilities within the second threshold value range.

Step S403 includes sending a paging configuration message to the UE, where the paging configuration message carries the probability threshold value and information about the groups for the more than one paging frames within the paging cycle.

In an example, the base station sends the paging configuration message carrying the probability threshold value and the information about the groups for the more than one paging frames within the paging cycle to the UE.

Step S404 includes obtaining a paging probability of the UE.

In an example, the base station obtains a paging probability of the UE sent by a core-network entity.

Step S405 includes sending the paging probability of the UE to the UE.

In an example, the base station sends the paging probability of the UE to the UE.

Step S406 includes determining the paging-frame group where the UE is located based on the probability threshold value, the paging probability of the UE and the groups for the more than one paging frames within the paging cycle.

In an example, the UE determines the probability threshold value and the groups for the more than one paging frames within the paging cycle based on the paging configuration message, and the UE determines the paging-frame group where the UE is located based on the probability threshold value, the groups for the more than one paging frames within the paging cycle and the paging probability of the UE.

Groups for the 16 UEs with the UE_IDs respectively being 0 to 15 are as shown in Table 1 in the above example.

Step S407 includes determining a starting monitoring frame where the UE is located and an ordinal number of a paging occasion where the UE is located based on a serial number of the UE and the number of the paging frames within the paging-frame group associated with the UE.

In an example, on the basis of a calculation formula $SFN_0 = (T \text{ div } N) \times (UE\_ID \text{ mod } N_1)$ for calculating the starting-monitoring frame, the UE calculates the starting-monitoring frame where the UE is located; and on the basis of a calculation formula $$i\_s = \text{floor}\left(\frac{UE\_ID}{N_i}\right) \text{ mod } Ns$$

for calculating the paging occasion, the UE calculates the ordinal number of the paging occasion where the UE is located.

The frame numbers of the starting-monitoring frames and the ordinal numbers of the paging occasions of the 16 UEs with the UE_IDs respectively being 0 to 15 are as shown in Table 2 in the above example.

Step S408 includes determining the paging occasion of the paging frame within the paging-frame group associated with the UE based on the starting-monitoring frame of the UE, the ordinal number of the paging occasion where the UE is located and the number of paging-frame groups which are previous to the paging-frame group associated with the UE and are in the same paging cycle as the paging-frame group associated with the UE.

In an example, on the basis of $$SFN_{Ni} = SFN_0 + (T \text{ div } N) \times \left(\sum_{j=1,\ldots i-1} N_j\right),$$

the UE calculates the paging frame within the paging-frame group where the UE is located; and determines the paging occasion of the paging frame within the paging-frame group associated with the UE based on the paging frame within the paging-frame group where the UE is located and the ordinal number of the paging occasion.

The paging occasions of the paging frames within the paging-frame groups associated with the 16 UEs with the UE_IDs respectively being 0 to 15 are as shown in Table 3 and FIG. 10 in the above example.

Step S409 includes monitoring, on the paging occasion of the paging frame within the paging-frame group associated with the UE, the paging message for paging the UE.

In an example, the UE monitors the paging message for paging the UE on the paging occasion of the paging frame within the paging-frame group associated with the UE.

In an example, step S406 to step S407 above may also be executed by the base station. Before step S409 above, the method further includes sending, on the paging occasion of the paging frame within the paging-frame group associated with the UE, the paging message for paging the UE.

In an example, there are 16 UEs with UE_IDs respectively being 0 to 15, one paging cycle includes 8 paging frames with frame numbers being 0 to 7 respectively, and one paging frame includes 2 paging occasions, so the frame numbers of the starting-monitoring frames and the ordinal numbers of the paging occasions of the 16 UEs with the UE_IDs respectively being 0 to 15 in step S407 above are as shown in Table 5 in the above example, and the paging occasions of the paging frames within the paging-frame groups associated with the 16 UEs with the UE_IDs respectively being 0 to 15 in step S408 above are as shown in Table 6 and FIG. 11 in the above example.

In the examples of the disclosure, the paging message for paging the UE may be sent on the paging occasion of the specific paging frame within the paging-frame group associated with each UE, so that the UE may accurately monitor its own paging message on that paging occasion of that paging frame, and unnecessary paging caused by other UEs monitoring that paging message can be reduced.

Figure 15:
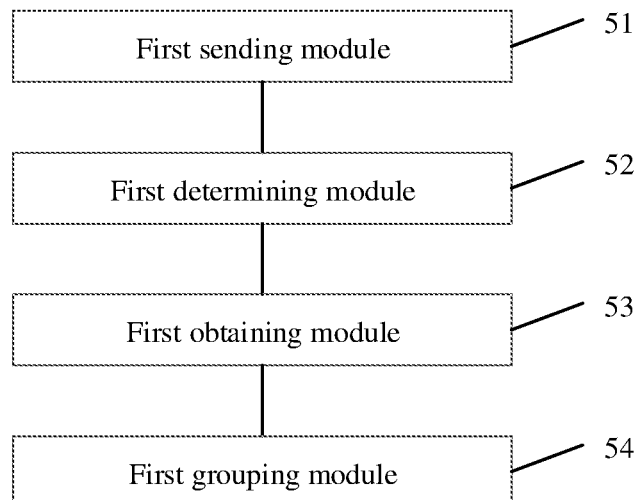
FIG. 15 is a block diagram of a paging processing apparatus according to an example of the disclosure.

As shown in FIG. 15, according to an example of the disclosure, there is provided a paging processing apparatus applied to a base station. The paging processing apparatus includes a first sending module 51, configured to broadcast a paging configuration message, where the paging configuration message is configured to indicate groups for more than one paging frame within one paging cycle, each of the groups includes at least one paging frame, and each of the groups is configured to associate user equipments (UEs) of the same type.

In some examples, the apparatus further includes a first determining module 52, configured to obtain the paging configuration message carrying different paging-frame groups by grouping the paging frames within the paging cycle based on paging probabilities of different types of UEs.

In some examples, the first determining module 52 is further configured to determine a probability-threshold-value group matching with each paging-frame group based on the paging probabilities of different types of UEs, where the paging configuration message is further configured to indicate probability threshold values matching with the paging-frame groups.

In some examples, the paging-frame groups include a specific paging-frame group. The specific paging-frame group is associated with UEs with the paging probabilities unable to be determined; and/or, the specific paging-frame group is associated with UEs with the paging probabilities being lower than a preset value.

In some examples, the apparatus further includes: a first obtaining module 53, configured to obtain a paging probability of at least one type of UEs; a first grouping module 54, configured to determine a paging-frame group associated with the UE based on the probability threshold values and the paging probability of the UE; and the first sending module 51, configured to send, on the paging-frame group associated with the UE, the paging message for paging the UE.

In some examples, the apparatus further includes: the first determining module 52, configured to determine an ordinal number of a paging occasion where the UE is located based on a serial number of the UE and the number of the paging frames within the paging-frame group associated with the UE; and to determine the paging occasion of the paging frame within the paging-frame group associated with the UE based on the ordinal number of the paging occasion where the UE is located and the sum of the number of paging frames within each paging-frame group which is previous to the paging-frame group associated with the UE and is in the same paging cycle as the paging-frame group associated with the UE.

In some examples, the first sending module 51 is configured to send, on the paging occasion of the paging frame within the paging-frame group associated with the UE, the paging message for paging the UE.

Figure 16:
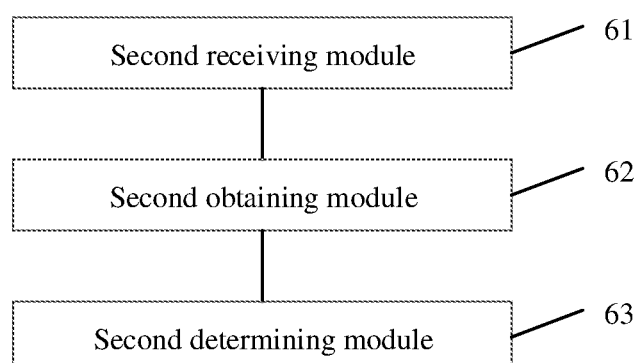
FIG. 16 is a block diagram of a paging processing apparatus according to an example of the disclosure.

As shown in FIG. 16, according to an example of the disclosure, there is provided a paging processing apparatus applied to a UE. The paging processing apparatus includes a second receiving module 61, configured to receive a paging configuration message, where the paging configuration message is configured to indicate groups for more than one paging frame within one paging cycle, each of the groups includes at least one paging frame, and each of the groups is configured to associate user equipments (UEs) of the same type.

In some examples, the paging configuration message is further configured to indicate paging probability threshold values matching with the paging-frame groups.

In some examples, the paging-frame groups include a specific paging-frame group. The specific paging-frame group is associated with UEs with the paging probabilities unable to be determined; and/or, the specific paging-frame group is associated with UEs with the paging probabilities being lower than a preset value.

In some examples, the apparatus further includes: a second obtaining module 62, configured to obtain a paging probability of the UE; a second determining module 63, configured to determine a paging-frame group associated with the UE based on the probability threshold values and the paging probability of the UE; and the second receiving module 61, configured to monitor, on the paging-frame group associated with the UE, the paging message for paging the UE sent by a base station.

In some examples, the second determining module 63 is configured to perform at least one of: determining the number of the paging frames associated with the UE based on the paging configuration message; and determining, based on the paging configuration message, the number of paging frames within each paging-frame group which is previous to the paging-frame group associated with the UE and is in the same paging cycle as the paging-frame group associated with the UE.

In some examples, the apparatus further includes: the second determining module 63, configured to determine an ordinal number of a paging occasion where the UE is located based on a serial number of the UE and the number of the paging frames within the paging-frame group associated with the UE; and to determine the paging occasion of the paging frame within the paging-frame group associated with the UE based on the ordinal number of the paging occasion where the UE is located and the sum of the number of paging frames within each paging-frame group which is previous to the paging-frame group associated with the UE and is in the same paging cycle as the paging-frame group associated with the UE.

In some examples, the second receiving module 61 is configured to monitor, on the paging occasion of the paging frame within the paging-frame group associated with the UE, the paging message for paging the UE.

As for the apparatus in the above examples, the manner in which each module performs operations has been described in detail in the examples of the method, which will not be described in detail here.

According to an example of the disclosure, there is provided a user equipment, including: a processor; and a memory, configured to store processor-executable instructions; where the processor is configured to implement the paging processing method of any example of the disclosure when executing the executable instructions.

The user equipment includes a base station or a user equipment.

The processor may include storage media of various types. The storage media are non-transitory computer storage media, and can continue to memorize information stored after the user equipment is powered down.

The processor may be connected with the memory through a bus and the like, and is configured to read executable programs stored on the memory, such as at least one of the methods as shown in FIGS. 4 to 5, 8 to 9 and 12 to 14.

According to an example of the disclosure, there is further provided a non-transitory computer storage medium. The computer storage medium stores computer-executable programs, and the executable programs, when executed by a processor, cause the processor to implement the paging processing method of any example of the disclosure, for example, at least one of the methods as shown in FIGS. 4 to 5, 8 to 9 and 12 to 14.

As for the apparatus in the above examples, the manner in which each module performs operations has been described in detail in the examples of the method, which will not be described in detail here.

Figure 17:
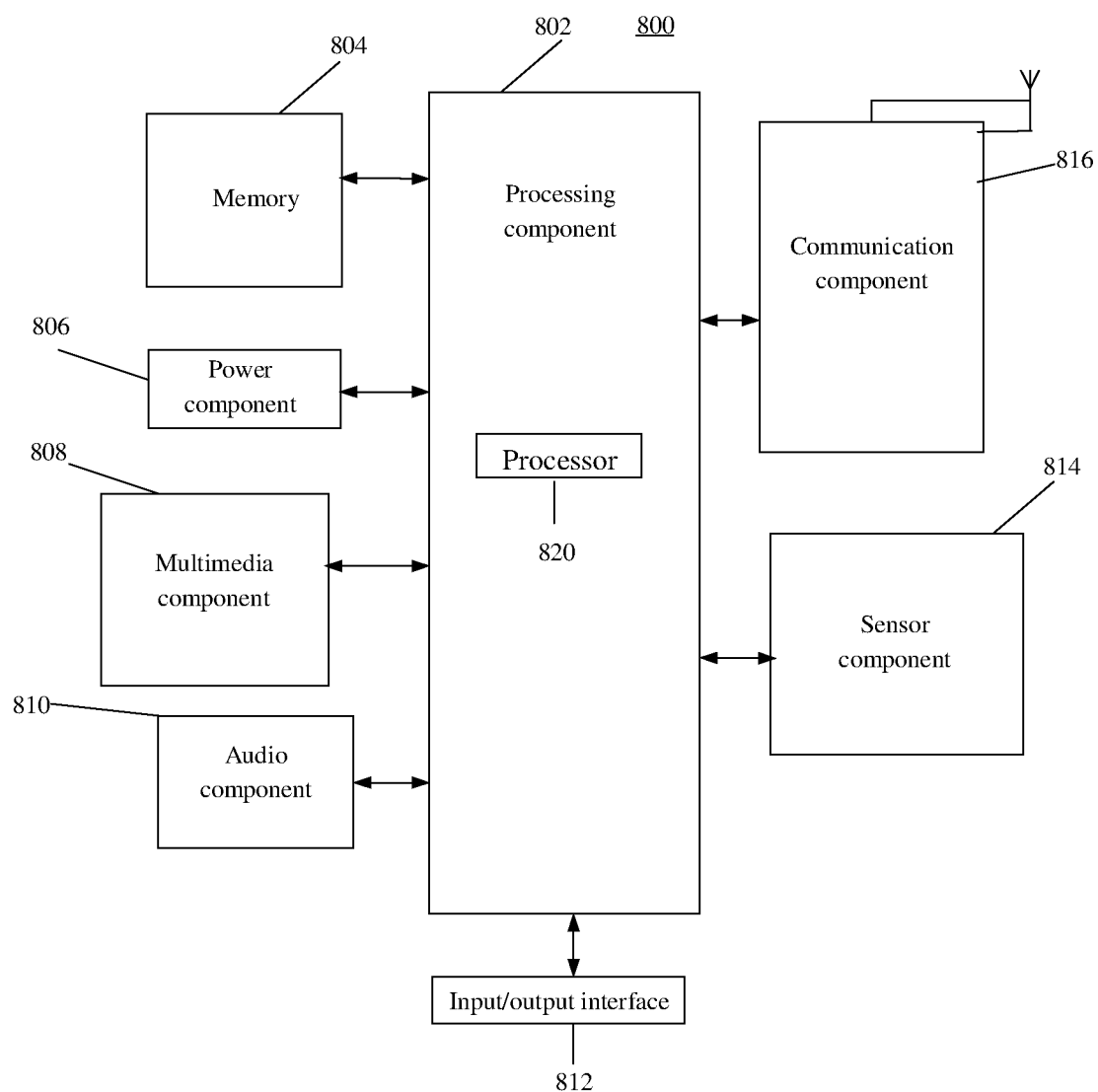
FIG. 17 is a block diagram of a user equipment according to an example of the disclosure.

FIG. 17 is a block diagram of a user equipment 800 according to an example of the disclosure. For example, the user equipment 800 may be a mobile phone, a computer, digital broadcasting user equipment, a messaging device, a game console, a tablet device, a medical device, a fitness device, a personal digital assistant, etc.

Referring to FIG. 17, the user equipment 800 may include one or more of the following components: a processing component 802, a memory 804, a power component 806, a multimedia component 808, an audio component 810, an input/output (I/O) interface 812, a sensor component 814, and a communication component 816.

The processing component 802 generally controls the overall operation of the user equipment 800, such as operations associated with display, telephone call, data communication, camera operations, and recording operations. The processing component 802 may include one or more processors 820 to execute instructions to complete all or part of the steps of the above methods. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations at the user equipment 800. Examples of these data include instructions for any application or method operating on the user equipment 800, contact data, phonebook data, messages, pictures, videos, etc. The memory 804 may be implemented by any type of volatile or nonvolatile storage device or their combination, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or an optical disk.

The power component 806 provides power for various components of the user equipment 800. The power component 806 may include a power management system, one or more power sources and other components associated with generating, managing and distributing power for the user equipment 800.

The multimedia component 808 includes a screen providing an output interface between the user equipment 800 and a user. In some examples, the screen may include a liquid crystal display (LCD) and a touch panel (TP). In the case that the screen includes the touch panel, the screen may be implemented as a touch screen to receive an input signal from the user. The touch panel includes one or more touch sensors to sense touch, sliding and gestures on the touch panel. The touch sensor can not only sense the boundary of the touch or sliding operation, but also detect the duration and pressure related to the touch or sliding operation. In some examples, the multimedia component 808 includes a front camera and/or a rear camera. When the user equipment 800 is in an operation mode, such as a shooting mode or a video mode, the front camera and/or the rear camera can receive external multimedia data. Each of front camera and rear camera can be a fixed optical lens system or have a focal length and optical zoom capability.

The audio component 810 is configured to output and/or input audio signals. For example, the audio component 810 includes a microphone (MIC) configured to receive an external audio signal when the user equipment 800 is in the operation mode, such as a call mode, a recording mode, and a speech recognition mode. The received audio signal may be further stored in the memory 804 or transmitted via the communication component 816. In some examples, the audio component 810 also includes a speaker for outputting an audio signal.

The I/O interface 812 provides an interface between the processing component 802 and a peripheral interface module which can be a keyboard, a click wheel, a button, etc. These buttons may include but are not limited to: a home button, volume buttons, a start button and a lock button.

The sensor component 814 includes one or more sensors for providing state evaluation of various aspects of the user equipment 800. For example, the sensor component 814 can detect an on/off state of the user equipment 800 and the relative positioning of the components, for example, the component is a display and a keypad of the user equipment 800. The sensor component 814 can also detect the change of the position of the user equipment 800 or one component of the user equipment 800, the presence or absence of user contact with the user equipment 800, the azimuth or acceleration/deceleration of the user equipment 800, and temperature change of the user equipment 800. The sensor component 814 may include a proximity sensor configured to detect the presence of nearby objects without any physical contact. The sensor component 814 may further include an optical sensor, such as a CMOS or CCD image sensor, for use in imaging applications. In some examples, the sensor component 814 may further include an acceleration sensor, a gyroscope sensor, a magnetic sensor, a pressure sensor, or a temperature sensor.

The communication component 816 is configured to facilitate wired or wireless communication between the user equipment 800 and other devices. The user equipment 800 may access a wireless network based on a communication standard, such as WiFi, 2G or 3G, or their combination. In an example, the communication component 816 receives a broadcast signal or broadcast-related information from an external broadcast management system via a broadcast channel. In an example, the communication component 816 further includes a near field communication (NFC) module to facilitate short-range communication. For example, the NFC module may be implemented based on radio frequency identification (RFID) technology, infrared data association (IrDA) technology, ultra wideband (UWB) technology, Bluetooth (BT) technology and other technologies.

In an example, the user equipment 800 may be implemented by one or more of a application-specific integrated circuits (ASIC), a digital signal processors (DSP), a digital signal processing devices (DSPD), a programmable logic devices (PLD), a field programmable gate array (FPGA), a controller, a microcontroller, a microprocessor, or other electronic element for performing the above method.

In an example, there is further provided a non-transitory computer-readable storage medium storing instructions, such as the memory 804 storing instructions, the instructions can be executed by the processor 820 of the user equipment 800 to complete the above methods. For example, the non-transitory computer-readable storage medium may be a ROM, a random access memory (RAM), a CD-ROM, a magnetic tape, a floppy disk, an optical data storage device, etc.

Figure 18:
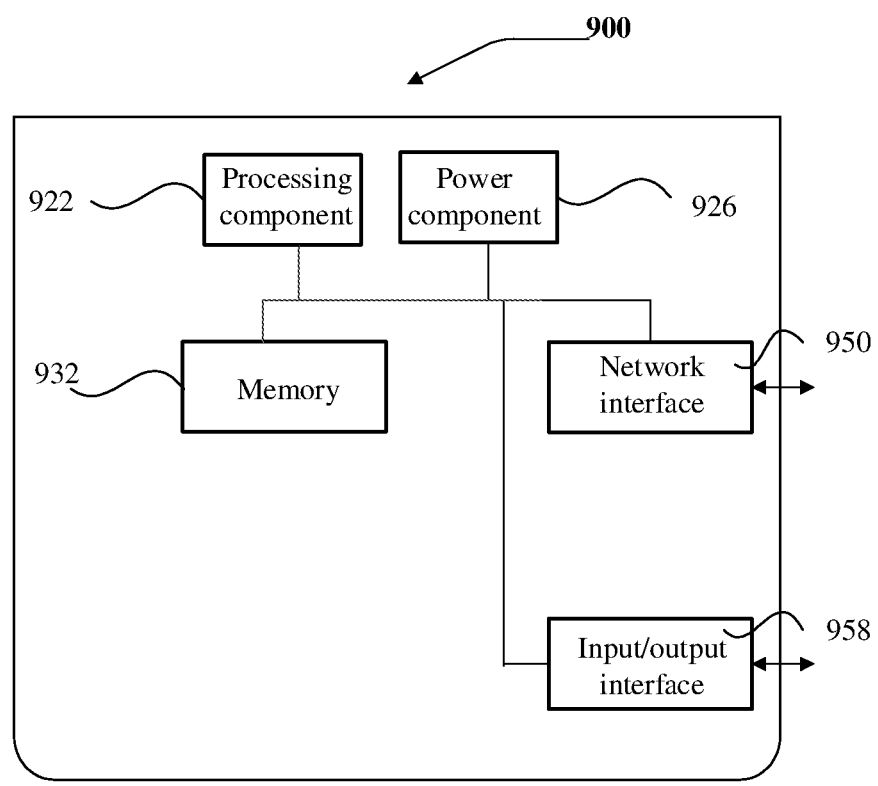
FIG. 18 is a block diagram of a base station according to an example of the disclosure.

As shown in FIG. 18, it shows a structure of a base station according to an example of the disclosure. For example, the base station 900 may be provided as a network-side device. Referring to FIG. 18, the base station 900 includes: a processing component 922, which further includes one or more processors; and a memory resource represented by a memory 932 for storing instructions, such as applications, that can be executed by the processing component 922. The applications stored in the memory 932 may include one or more modules each corresponding to a set of instructions. In addition, the processing component 922 is configured to execute instructions to execute any method applied to the base station above, such as the methods shown in FIG. 4 or 14 or the like.

The base station 900 may further include a power component 926 configured to perform power management of the base station 900, a wired or wireless network interface 950 configured to connect the base station 900 to the network, and an input/output (I/O) interface 958. The base station 900 can operate an operating system stored on the memory 932, such as Windows Server™, Mac OS X™, Unix™, Linux™, FreeBSD™, or the like.

Additional non-limiting embodiments of the disclosure include the following.

According to a first aspect of the examples of the disclosure, there is provided a paging processing method performed by a base station, and the paging processing method includes: broadcasting a paging configuration message, where the paging configuration message is configured to indicate groups for more than one paging frame within one paging cycle, each of the groups includes at least one paging frame, and each of the groups is configured to associate user equipments (UEs) of the same type.

In some examples, the method further includes: obtaining the paging configuration message carrying different paging-frame groups by grouping the paging frames within the paging cycle based on paging probabilities of different types of UEs.

In some examples, the method further includes: determining a probability-threshold-value group matching with each paging-frame group based on the paging probabilities of different types of UEs, where the paging configuration message is further configured to indicate probability threshold values matching with the paging-frame groups.

In some examples, the paging-frame groups include a specific paging-frame group. The specific paging-frame group is associated with UEs with the paging probabilities unable to be determined; and/or, the specific paging-frame group is associated with UEs with the paging probabilities being lower than a preset value.

In some examples, the method further includes: obtaining a paging probability of at least one UE; determining a paging-frame group associated with the UE based on the probability threshold values and the paging probability of the UE; and sending, on the paging-frame group associated with the UE, a paging message associated with paging the UE.

In some examples, the method further includes: determining an ordinal number of a paging occasion where the UE is located based on a serial number of the UE and the number of the paging frames within the paging-frame group associated with the UE; and determining the paging occasion of the paging frame within the paging-frame group associated with the UE, based on the ordinal number of the paging occasion where the UE is located and the sum of the number of paging frames within each paging-frame group which is previous to the paging-frame group associated with the UE and is in the same paging cycle as the paging-frame group associated with the UE.

In some examples, sending, on the paging-frame group associated with the UE, the paging message for paging the UE includes: sending, on the paging occasion of the paging frame within the paging-frame group associated with the UE, the paging message for paging the UE.

According to a second aspect of the examples of the disclosure, there is provided a paging processing method performed by a UE, and the paging processing method includes: receiving a paging configuration message, where the paging configuration message is configured to indicate groups for more than one paging frame within one paging cycle, each of the groups includes at least one paging frame, and each of the groups is configured to associate user equipments (UEs) of the same type.

In some examples, the paging configuration message is further configured to indicate probability threshold values matching with the paging-frame groups.

In some examples, the paging-frame groups include a specific paging-frame group. The specific paging-frame group is associated with UEs with the paging probabilities unable to be determined; and/or, the specific paging-frame group is associated with UEs with the paging probabilities being lower than a preset value.

In some examples, the method further includes: obtaining a paging probability of the UE; determining a paging-frame group associated with the UE based on the probability threshold values and the paging probability of the UE; and monitoring, on the paging-frame group associated with the UE, a paging message for paging the UE sent by a base station.

In some examples, the method further includes at least one of: determining the number of the paging frames within the paging-frame group associated with the UE based on the paging configuration message; and determining, based on the paging configuration message, the number of paging frames within each paging-frame group which is previous to the paging-frame group associated with the UE and is in the same paging cycle as the paging-frame group associated with the UE.

In some examples, the method includes: determining an ordinal number of a paging occasion where the UE is located based on a serial number of the UE and the number of the paging frames within the paging-frame group associated with the UE; and determining the paging occasion of the paging frame within the paging-frame group associated with the UE, based on the ordinal number of the paging occasion where the UE is located and the sum of the number of paging frames within each paging-frame group which is previous to the paging-frame group associated with the UE and is in the same paging cycle as the paging-frame group associated with the UE.

In some examples, monitoring, on the paging-frame group associated with the UE, the paging message for paging the UE sent by the base station includes: monitoring, on the paging occasion of the paging frame within the paging-frame group associated with the UE, the paging message for paging the UE.

According to a third aspect of the disclosure, there is provided a paging processing apparatus applied to a base station, and the paging processing apparatus includes: a first sending module, configured to broadcast a paging configuration message, where the paging configuration message is configured to indicate groups for more than one paging frame within one paging cycle, each of the groups includes at least one paging frame, and each of the groups is configured to associate user equipments (UEs) of the same type.

In some examples, the apparatus further includes: a first determining module, configured to obtain the paging configuration message carrying different paging-frame groups by grouping the paging frames within the paging cycle based on paging probabilities of different types of UEs.

In some examples, the first determining module is further configured to determine a probability-threshold-value group matching with each paging-frame group based on the paging probabilities of different types of UEs, where the paging configuration message is further configured to indicate probability threshold values matching with the paging-frame groups.

In some examples, the paging-frame groups include a specific paging-frame group. The specific paging-frame group is associated with UEs with the paging probabilities unable to be determined; and/or, the specific paging-frame group is associated with UEs with the paging probabilities being lower than a preset value.

In some examples, the apparatus further includes: a first obtaining module, configured to obtain a paging probability of at least one type of UEs; a first grouping module, configured to determine a paging-frame group associated with the UE based on the probability threshold values and the paging probability of the UE; and the first sending module, configured to send, on the paging-frame group associated with the UE, a paging message associated with paging the UE.

In some examples, the apparatus further includes: a first determining module, configured to determine an ordinal number of a paging occasion where the UE is located based on a serial number of the UE and the number of the paging frames within the paging-frame group associated with the UE; and to determine the paging occasion of the paging frame within the paging-frame group associated with the UE based on the ordinal number of the paging occasion where the UE is located and the sum of the number of paging frames within each paging-frame group which is previous to the paging-frame group associated with the UE and is in the same paging cycle as the paging-frame group associated with the UE.

In some examples, the first sending module is configured to send, on the paging occasion of the paging frame within the paging-frame group associated with the UE, the paging message for paging the UE.

According to a fourth aspect of the disclosure, there is provided a paging processing apparatus applied to UE, and the paging processing apparatus includes: a second receiving module, configured to receive a paging configuration message, where the paging configuration message is configured to indicate groups for more than one paging frame within one paging cycle, each of the groups includes at least one paging frame, and each of the groups is configured to associate user equipments (UEs) of the same type.

In some examples, the paging configuration message is further configured to indicate paging probability threshold values matching with the paging-frame groups.

In some examples, the paging-frame groups include a specific paging-frame group. The specific paging-frame group is associated with UEs with the paging probabilities unable to be determined; and/or, the specific paging-frame group is associated with UEs with the paging probabilities being lower than a preset value.

In some examples, the apparatus further includes: a second obtaining module, configured to obtain a paging probability of the UE; a second determining module, configured to determine a paging-frame group associated with the UE based on the probability threshold values and the paging probability of the UE; and a second receiving module, configured to monitor, on the paging-frame group associated with the UE, a paging message for paging the UE sent by a base station.

In some examples, the second determining module is configured to perform at least one of: determining the number of the paging frames associated with the UE based on the paging configuration message; and determining, based on the paging configuration message, the number of paging frames within each paging-frame group which is previous to the paging-frame group associated with the UE and is in the same paging cycle as the paging-frame group associated with the UE.

In some examples, the apparatus further includes: a second determining module, configured to determine an ordinal number of a paging occasion where the UE is located based on a serial number of the UE and the number of the paging frames within the paging-frame group associated with the UE; and to determine the paging occasion of the paging frame within the paging-frame group associated with the UE based on the ordinal number of the paging occasion where the UE is located and the sum of the number of paging frames within each paging-frame group which is previous to the paging-frame group associated with the UE and is in the same paging cycle as the paging-frame group associated with the UE.

In some examples, the second receiving module is configured to monitor, on the paging occasion of the paging frame within the paging-frame group associated with the UE, the paging message for paging the UE.

According to a fifth aspect of the examples of the disclosure, there is provided a communication device, including: a processor; and a memory, configured to store processor-executable instructions; where the processor is configured to implement the paging processing method of any example of the disclosure when running the executable instructions.

According to a sixth aspect of the examples of the disclosure, there is provided a non-transitory computer storage medium, the computer storage medium stores computer-executable programs, and the executable programs, when executed by a processor, cause the processor to execute the paging processing method of any example of the disclosure.

The technical solution provided by the examples of the disclosure may possess the following beneficial effects: the base station broadcasts the paging configuration message for indicating the groups for more than one paging frame within one paging cycle, and each group is configured to associate the UEs of the same type, in this way, the UE is able to know the knowledge of more than one group within one paging cycle, facilitating the UE to subsequently determine, based on its own type, which paging-frame group it should be located in.

Moreover, the grouping for the paging frames within the paging cycle according to the examples of the disclosure is based on the type of the UEs, and each group is configured to associate the UEs of the same type. In this way, when a paging message for paging the UE is sent subsequently, it is possible to significantly reduce the situation where only one or a few UEs in one group are actually paged while the other UEs actually need to receive the paging message as well although they are not paged actually, thus reducing the occurrence of unnecessary paging.

Other examples of the disclosure will be apparent to those skilled in the art from consideration of the specification and practice of the disclosure. The disclosure is intended to cover any variations, uses, or adaptations of the disclosure following the general principles of the disclosure and including the known common knowledge or habitual technical means in the art which is not disclosed by the disclosure. It is intended that the specification and examples be considered as exemplary, with a true scope and spirit of the disclosure being indicated by the following claims.

It will be appreciated that the disclosure is not limited to the exact construction that has been described above and illustrated in the accompanying drawings, and that various modifications and changes may be made without departing from the scope of the disclosure. It is intended that the scope of the disclosure only be limited by the appended claims.

The invention claimed is:

1. A paging processing method, performed by a base station, and comprising:
broadcasting a paging configuration message, wherein the paging configuration message is configured to indicate groups for more than one paging frame within one paging cycle, each of the groups comprises at least one paging frame, and each of the groups is configured to associate user equipments (UEs) of the same type;
wherein the paging processing method further comprises:
determining a probability-threshold-value group matching with each paging-frame group based on paging probabilities of different types of UEs, wherein the paging configuration message is further configured to indicate probability threshold values matching with the paging-frame groups;
wherein the paging processing method further comprises:
obtaining a paging probability of at least one type of UE;
determining the paging-frame group associated with the UE based on the probability threshold values and the paging probability of the UE; and
sending, on the paging-frame group associated with the UE, a paging message associated with paging the UE;
wherein the paging processing method further comprises:
determining an ordinal number of a paging occasion where the UE is located based on a serial number of the UE and a number of the paging frames within the paging-frame group associated with the UE; and
determining the paging occasion of the paging frame within the paging-frame group associated with the UE based on the ordinal number of the paging occasion where the UE is located and a sum of a number of paging frames within each paging-frame group which is previous to the paging-frame group associated with the UE and is in the same paging cycle as the paging-frame group associated with the UE.

2. The paging processing method according to claim 1, further comprising:
obtaining the paging configuration message carrying different paging-frame groups by grouping the paging frames within the paging cycle based on the paging probabilities of the different types of UEs.

3. The paging processing method according to claim 1, wherein the paging-frame groups comprise a specific paging-frame group, wherein the specific paging-frame group is associated with UEs with the paging probabilities unable to be determined;
and/or,
the specific paging-frame group is associated with UEs with the paging probabilities being lower than a preset value.

4. The paging processing method according to claim 1, wherein sending, on the paging-frame group associated with the UE, the paging message for paging the UE comprises:
sending, on the paging occasion of the paging frame within the paging-frame group associated with the UE, the paging message for paging the UE.

5. A paging processing method, performed by a user equipment (UE), and comprising:
receiving a paging configuration message, wherein the paging configuration message is configured to indicate groups for more than one paging frame within one paging cycle, each of the groups comprises at least one paging frame, and each of the groups is configured to associate the UE of the same type;
wherein the paging processing method further comprises:
obtaining a paging probability of the UE;
determining a paging-frame group associated with the UE based on probability threshold values and the paging probability of the UE; and
monitoring, on the paging-frame group associated with the UE, a paging message for paging the UE sent by a base station;
wherein the paging processing method further comprises at least one of the following:
determining a number of the paging frames within the paging-frame group associated with the UE based on the paging configuration message; or
determining, based on the paging configuration message, a number of the paging frames within each paging-frame group which is previous to the paging-frame group associated with the UE and is in the same paging cycle as the paging-frame group associated with the UE;
wherein the paging processing method further comprises:
determining an ordinal number of a paging occasion where the UE is located based on a serial number of the UE and a number of the paging frames within the paging-frame group associated with the UE; and
determining the paging occasion of the paging frame within the paging-frame group associated with the UE based on the ordinal number of the paging occasion where the UE is located and a sum of a number of paging frames within each paging-frame group which is previous to the paging-frame group associated with the UE and is in the same paging cycle as the paging-frame group associated with the UE.

6. The paging processing method according to claim 5, wherein the paging configuration message is further configured to indicate probability threshold values matching with the paging-frame groups.

7. The paging processing method according to claim 5, wherein the paging-frame groups comprise a specific paging-frame group, wherein the specific paging-frame group is associated with UEs with paging probabilities unable to be determined;
and/or,
the specific paging-frame group is associated with UEs with the paging probabilities being lower than a preset value.

8. The paging processing method according to claim 5, wherein monitoring, on the paging-frame group associated with the UE, the paging message for paging the UE sent by the base station comprises:

monitoring, on the paging occasion of the paging frame within the paging-frame group associated with the UE, the paging message for paging the UE.

9. A communication device, comprising:
one or more processors; and
a memory configured to store processor-executable instructions;
wherein the processor-executable instructions, when collectively executed by the one or more processors, cause the communication device to:
broadcast a paging configuration message, wherein the paging configuration message is configured to indicate groups for more than one paging frame within one paging cycle, wherein each of the groups comprises at least one paging frame, and each of the groups is configured to associate user equipments (UEs) of the same type;
wherein the processor-executable instructions, when collectively executed by the one or more processors, further cause the communication device to:
determine a probability-threshold-value group matching with each paging-frame group based on paging probabilities of different types of UEs, wherein the paging configuration message is further configured to indicate probability threshold values matching with the paging-frame groups;
wherein the processor-executable instructions, when collectively executed by the one or more processors, further cause the communication device to:
obtain a paging probability of at least one type of UE;
determine the paging-frame group associated with the UE based on the probability threshold values and the paging probability of the UE; and
send, on the paging-frame group associated with the UE, a paging message associated with paging the UE;
wherein the processor-executable instructions, when collectively executed by the one or more processors, further cause the communication device to:
determine an ordinal number of a paging occasion where the UE is located based on a serial number of the UE and a number of the paging frames within the paging-frame group associated with the UE; and
determine the paging occasion of the paging frame within the paging-frame group associated with the UE based on the ordinal number of the paging occasion where the UE is located and a sum of a number of paging frames within each paging-frame group which is previous to the paging-frame group associated with the UE and is in the same paging cycle as the paging-frame group associated with the UE.

10. A non-transitory computer storage medium storing computer-executable programs, wherein the computer-executable programs, when collectively executed by one or more processors, cause the one or more processors perform the paging processing method according to claim 1.

11. A communication device, comprising:
one or more processors; and
a memory configured to store processor-executable instructions;
wherein the processor-executable instructions, when collectively executed by the one or more processors, cause the communication device to perform the paging processing method according to claim 5.

12. A non-transitory computer storage medium storing computer-executable programs, wherein the computer-executable programs, when collectively executed by one or more processors, cause the one or more processors to perform the paging processing method according to claim 5.

* * * * *